(12) United States Patent
Miida et al.

(10) Patent No.: US 10,592,940 B2
(45) Date of Patent: *Mar. 17, 2020

(54) TRANSMISSION SYSTEM, PARTICIPATION FEE MANAGEMENT METHOD, COMPUTER PROGRAM PRODUCT, AND MAINTENANCE SYSTEM

(71) Applicant: RICOH COMPANY, LIMITED, Tokyo (JP)

(72) Inventors: Tetsuya Miida, Tokyo (JP); Yuuta Hamada, Tokyo (JP); Yoichi Kanai, Kanagawa (JP); Naoki Umehara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 15/337,709

(22) Filed: Oct. 28, 2016

(65) Prior Publication Data

US 2017/0046755 A1 Feb. 16, 2017

Related U.S. Application Data

(63) Continuation of application No. 14/346,434, filed as application No. PCT/JP2012/075868 on Sep. 28, 2012, now Pat. No. 9,516,175.

(30) Foreign Application Priority Data

Sep. 30, 2011 (JP) ................................. 2011-217053

(51) Int. Cl.
*H04L 29/08* (2006.01)
*G06Q 30/04* (2012.01)
(Continued)

(52) U.S. Cl.
CPC ........... *G06Q 30/04* (2013.01); *H04L 65/403* (2013.01); *H04L 67/24* (2013.01); *H04M 15/07* (2013.01);
(Continued)

(58) Field of Classification Search
CPC ....... G06Q 30/04; H04L 65/403; H04L 67/24; H04M 15/07; H04M 15/60; H04M 3/567
See application file for complete search history.

(56) References Cited

U.S. PATENT DOCUMENTS 5,844,973 A 12/1998 Venkatraman et al.
5,943,406 A 8/1999 Leta
(Continued)

FOREIGN PATENT DOCUMENTS

CA 2224573 1/1997
CN 101227631 A 7/2008
(Continued)

OTHER PUBLICATIONS

Canadian Office Action dated Jul. 25, 2016.
(Continued)

*Primary Examiner* — Mansour Oveissi
(74) *Attorney, Agent, or Firm* — Oblon, McClelland, Maier & Neustadt, L.L.P.

(57) ABSTRACT

A transmission system includes: a transmission management system and a fee management system. The transmission management system manages participation time information using a given transmission terminal. The fee management system manages participation fee information. The transmission management system includes a transmission unit that transmits the participation time information to the fee management system. The fee management system includes: a user management unit that manages user identification information and terminal identification information in a
(Continued)

manner linked; a reception unit that receives the participation time information transmitted from the transmission management system; a participation time calculation unit that calculates a total participation time of conversation; a participation fee calculation unit that calculates a participation fee; and a participation fee summing unit that refers to the user management unit, sums up participation fees of each transmission terminal, and calculates a total participation fee for each user.

7 Claims, 20 Drawing Sheets

(51) Int. Cl.
*H04M 15/00* (2006.01)
*H04L 29/06* (2006.01)
*H04M 3/56* (2006.01)

(52) U.S. Cl.
CPC ....... *H04M 15/60* (2013.01); *H04M 15/8072* (2013.01); *H04M 15/844* (2013.01); *H04M 15/863* (2013.01); *H04M 3/56* (2013.01); *H04M 3/565* (2013.01); *H04M 3/567* (2013.01)

(56) References Cited

U.S. PATENT DOCUMENTS

| | | | |
|---|---|---|---|
| 6,023,499 A | 2/2000 | Mansey et al. | |
| 6,356,541 B1 | 3/2002 | Muller | |
| 6,427,008 B1 | 7/2002 | Balaz | |
| 6,725,460 B1 | 4/2004 | Nishiyama | |
| 6,868,399 B1 | 3/2005 | Short | |
| 7,319,745 B1 | 1/2008 | Firestone | |
| 7,603,103 B1 | 10/2009 | Mau | |
| 7,730,014 B2 | 6/2010 | Hartenstein | |
| 7,907,550 B1* | 3/2011 | Chu | H04M 3/56 370/260 |
| 8,219,635 B2 | 7/2012 | Ganesan | |
| 8,290,471 B1 | 10/2012 | Jones | |
| 8,510,179 B2 | 8/2013 | Kahlon | |
| 8,688,072 B1* | 4/2014 | Agarwal | H04W 12/06 379/126 |
| 8,813,220 B2 | 8/2014 | Knapp | |
| 9,516,175 B2* | 12/2016 | Miida | G06Q 30/04 |
| 2001/0044779 A1 | 11/2001 | Iima | |
| 2002/0120708 A1 | 8/2002 | Mizukami | |
| 2002/0187771 A1 | 12/2002 | Eto | |
| 2003/0083041 A1 | 5/2003 | Kumar | |
| 2003/0193728 A1 | 10/2003 | Bang | |
| 2004/0082352 A1 | 4/2004 | Keating | |
| 2004/0091091 A1 | 5/2004 | Maruyama | |
| 2004/0101117 A1 | 5/2004 | Koskinen | |
| 2004/0117311 A1 | 6/2004 | Agarwal | |
| 2005/0055440 A1 | 3/2005 | Marilly | |
| 2006/0233334 A1 | 10/2006 | Bingaman et al. | |
| 2007/0201670 A1 | 8/2007 | Fukui | |
| 2008/0021995 A1* | 1/2008 | Liu | G06Q 20/10 709/224 |
| 2008/0027839 A1 | 1/2008 | O'Regan | |
| 2008/0104241 A1* | 5/2008 | Kodama | H04L 63/145 709/225 |
| 2008/0130843 A1 | 6/2008 | Ueshima | |
| 2008/0200168 A1 | 8/2008 | Jiang | |
| 2008/0209462 A1 | 8/2008 | Rodov | |
| 2009/0110163 A1 | 4/2009 | Gupta | |
| 2009/0316865 A1 | 12/2009 | Jones | |
| 2010/0123962 A1 | 5/2010 | O'Brien | |
| 2010/0188975 A1 | 7/2010 | Raleigh | |
| 2010/0222022 A1* | 9/2010 | Fujita | H04L 63/0807 455/406 |
| 2010/0228654 A1 | 9/2010 | Yamamoto | |
| 2011/0161212 A1 | 6/2011 | Bozionek | |
| 2012/0035952 A1 | 2/2012 | Coyne | |
| 2012/0041858 A1* | 2/2012 | Lewis | G06Q 10/04 705/34 |
| 2012/0179581 A1 | 7/2012 | Gravino | |
| 2012/0209949 A1* | 8/2012 | Deliyannis | H04L 65/4084 709/217 |
| 2012/0224678 A1 | 9/2012 | Walters | |
| 2013/0007298 A1* | 1/2013 | Ramaswamy | H04L 65/607 709/231 |
| 2013/0018764 A1 | 1/2013 | Deng | |
| 2014/0045455 A1 | 2/2014 | Miida et al. | |
| 2014/0379361 A1 | 12/2014 | Mahadkar | |
| 2015/0088997 A1 | 3/2015 | van Dijk | |

FOREIGN PATENT DOCUMENTS

| | | |
|---|---|---|
| JP | 9-172509 | 6/1997 |
| JP | 2002-109403 | 4/2002 |
| JP | 2002-290635 | 10/2002 |
| JP | 2003-345896 | 12/2003 |
| JP | 2003-348266 | 12/2003 |
| JP | 2004-199164 | 7/2004 |
| JP | 2005-109784 | 4/2005 |
| JP | 2008-041026 | 2/2008 |
| WO | WO 2011/078411 A1 | 6/2011 |

OTHER PUBLICATIONS

Japanese Office Action dated Mar. 15, 2016 issued in Japanese Application No. 2011-217053.
International Search Report dated Oct. 30, 2012 in PCT/JP2012/075868 filed on Sep. 28, 2012.
Combined Office Action and Search Report issued Sep. 28, 2014 in Chinese Patent Application No. 201280047195.4 (with English translation).
Extended European Search Report dated Feb. 12, 2015 in Patent Application No. 12837044.2

* cited by examiner

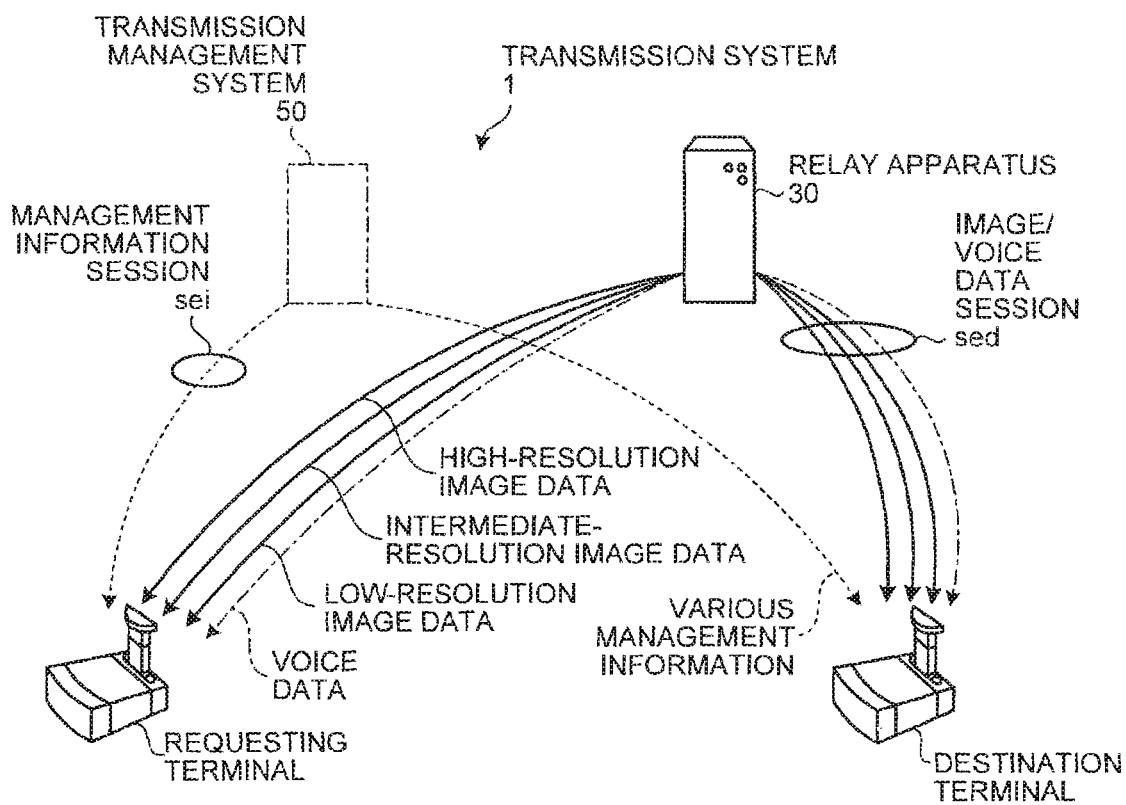
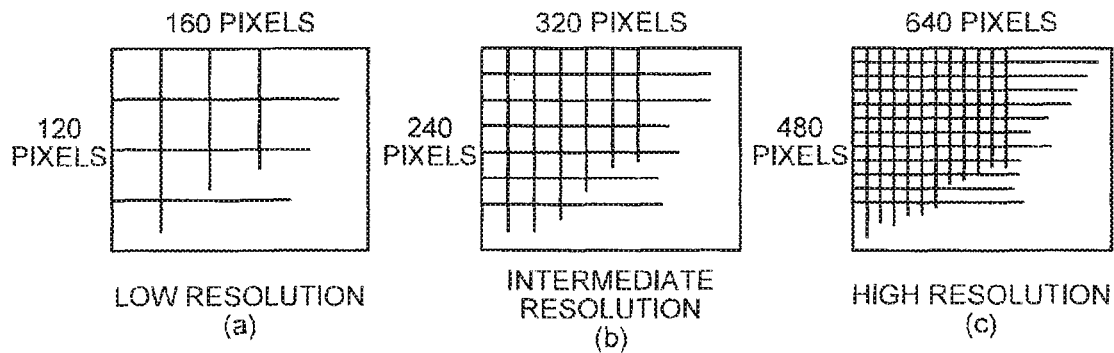

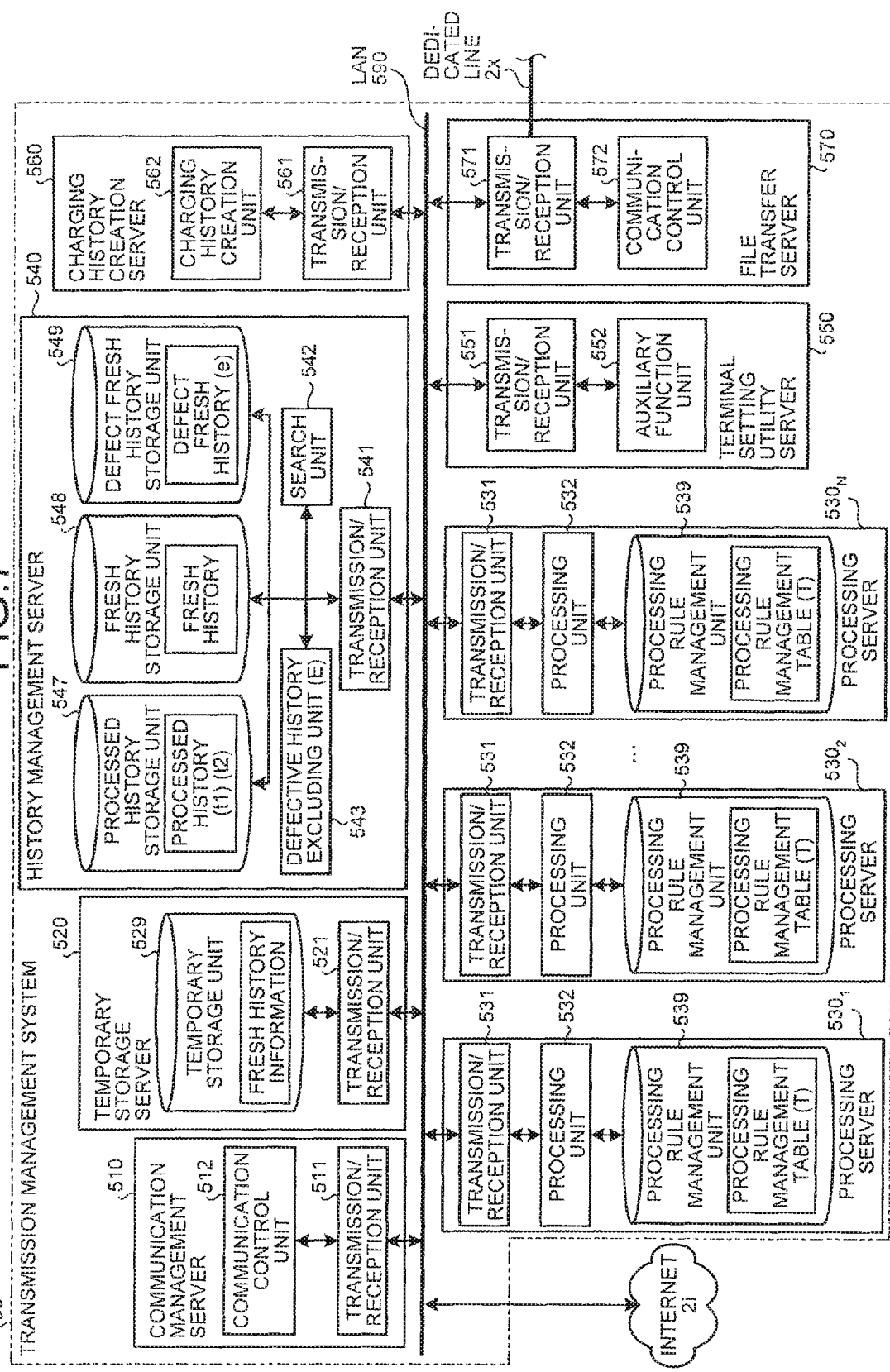

FIG.8

PROCESSING RULE MANAGEMENT TABLE (T)

| PROCESSING START CONDITION (COMMUNICATION STATE) | POST-PROCESSING TARGET TABLE | POST-PROCESSING TARGET RECORD | PROCESSING CONTENTS |
|---|---|---|---|
| COMMUNICATION STATE="invite" | CONFERENCE HISTORY MANAGEMENT TABLE (t2) | RECORD INDICATING SAME CONFERENCE ID | CONFERENCE ID=<u>CONFERENCE ID</u><br>HOST TERMINAL ID=<br><u>TRANSMISSION SOURCE TERMINAL ID</u> |
| COMMUNICATION STATE="start" | CONFERENCE HISTORY MANAGEMENT TABLE (t2) | RECORD INDICATING SAME CONFERENCE ID | CONFERENCE ID=<u>CONFERENCE ID</u><br>HELD DATE AND TIME=<br><u>COMMUNICATION DATE AND TIME</u><br>CONFERENCE TIME=<br>END DATE AND TIME · COMMUNICATION DATE AND TIME |
| COMMUNICATION STATE="end" | CONFERENCE HISTORY MANAGEMENT TABLE (t2) | RECORD INDICATING SAME CONFERENCE ID | CONFERENCE ID=<u>CONFERENCE ID</u><br>HELD DATE AND TIME=<br><u>COMMUNICATION DATE AND TIME</u><br>CONFERENCE TIME=<br>CONFERENCE TIME · HELD DATE AND TIME |
| COMMUNICATION STATE="join" | PARTICIPANT HISTORY MANAGEMENT TABLE (t1) | RECORD INDICATING SAME CONFERENCE SESSION ID | HOST TERMINAL ID=<br><u>TRANSMISSION SOURCE TERMINAL ID</u><br>CONFERENCE ID=<u>CONFERENCE ID</u><br>CONFERENCE SESSION ID=<br><u>CONFERENCE SESSION ID</u><br>PARTICIPATION DATE AND TIME=<br><u>COMMUNICATION DATE AND TIME</u><br>PARTICIPATION TIME=(LEAVING DATE AND TIME-<u>COMMUNICATION DATE AND TIME</u>)<br>LEAVING STATE="DURING CONFERENCE" |
| COMMUNICATION STATE="leave" | PARTICIPANT HISTORY MANAGEMENT TABLE (t1) | RECORD INDICATING SAME CONFERENCE SESSION ID | HOST TERMINAL ID=<br>TRANSMISSION SOURCE TERMINAL ID<br>CONFERENCE ID=<u>CONFERENCE ID</u><br>CONFERENCE SESSION ID=<br><u>CONFERENCE SESSION ID</u><br>PARTICIPATION DATE AND TIME=<br><u>COMMUNICATION DATE AND TIME</u><br>PARTICIPATION TIME=(<u>COMMUNICATION DATE AND TIME</u> · PARTICIPATION DATE AND TIME)<br>LEAVING STATE="NORMAL" |
| COMMUNICATION STATE="offline"<br>CONFERENCE ID!=null<br>CONFERENCE SESSION ID!=null | PARTICIPANT HISTORY MANAGEMENT TABLE (t1) | RECORD INDICATING SAME CONFERENCE SESSION ID | HOST TERMINAL ID=<br><u>TRANSMISSION SOURCE TERMINAL ID</u><br>CONFERENCE ID=<u>CONFERENCE ID</u><br>CONFERENCE SESSION ID=<br><u>CONFERENCE SESSION ID</u><br>PARTICIPATION DATE AND TIME=<br><u>COMMUNICATION DATE AND TIME</u><br>PARTICIPATION TIME=(<u>COMMUNICATION DATE AND TIME</u> · PRTICIPATION DATE AND TIME)<br>LEAVING STATE="FORCE-QUIT" |
| ... | ... | ... | ... |

* UNDERLINED TERMS INDICATE ITEM VALUES OF FRESH HISTORY INFORMATION

FIG.9

FRESH HISTORY INFORMATION

| COMMUNI-CATION STATE | REQUESTING TERMINAL ID | DESTI-NATION TERMINAL ID | SESSION ID | CONFER-ENCE ID | CONFER-ENCE SESSION ID | COMMUNICATION DATE AND TIME |
|---|---|---|---|---|---|---|
| online | 110001 | - | se001 | - | - | 2010-09-01 09:30:00 |
| online | 110002 | - | se002 | - | - | 2010-09-01 09:30:00 |
| online | 110003 | - | se003 | - | - | 2010-09-01 09:30:00 |
| intive | 110001 | 110002 | - | conf001 | - | 2010-09-01 09:59:50 |
| accept | 110002 | 110001 | - | conf001 | - | 2010-09-01 09:59:59 |
| start | 110001 | - | - | conf001 | - | 2010-09-01 10:00:00 |
| join | 110001 | - | - | conf001 | cse001 | 2010-09-01 10:00:00 |
| join | 110002 | - | - | conf001 | cse001 | 2010-09-01 10:00:00 |
| call | 110003 | 110001 | - | conf001 | - | 2010-09-01 10:09:50 |
| accept | 110001 | 110003 | - | conf001 | - | 2010-09-01 10:09:59 |
| join | 110003 | - | - | conf001 | cse003 | 2010-09-01 10:10:00 |
| leave | 110002 | - | - | conf001 | cse002 | 2010-09-01 10:40:00 |
| offline | 110003 | - | se003 | conf001 | cse003 | 2010-09-01 11:30:25 |
| leave | 110001 | - | - | conf001 | cse001 | 2010-09-01 11:30:25 |
| end | 110001 | - | - | conf001 | - | 2010-09-01 11:30:25 |
| offline | 110001 | - | se001 | - | - | 2010-09-01 11:35:00 |
| offline | 110002 | - | se002 | - | - | 2010-09-01 11:40:00 |
| ... | ... | ... | ... | ... | ... | ... |
| online | 110005 | - | se005 | - | - | 2010-09-12 14:20:00 |
| online | 110006 | - | se006 | - | - | 2010-09-12 14:21:00 |
| intive | 110005 | 110006 | - | conf002 | - | 2010-09-12 14:29:50 |
| accept | 110006 | 110005 | - | conf002 | - | 2010-09-12 14:29:55 |
| start | 110005 | - | - | conf002 | - | 2010-09-12 14:30:00 |
| join | 110005 | - | - | conf002 | cse005 | 2010-09-12 14:30:00 |
| ... | ... | ... | ... | ... | ... | ... |

FIG.10A

PARTICIPANT HISTORY MANAGEMENT TABLE (t1)

| HISTORY ID | TERMINAL ID | CONFER-ENCE ID | CONFER-ENCE SESSION ID | PARTICI-PATION DATE AND TIME | LEAVING DATE AND TIME | PARTICI-PATION TIME | LEAVING STATE |
|---|---|---|---|---|---|---|---|
| 001 | 110001 | conf001 | cse001 | 2010-09-01 10:00:00 | 2010-09-01 11:30:25 | 01:30:25 | LEAVE |
| 002 | 110002 | conf001 | cse002 | 2010-09-01 10:00:00 | 2010-09-01 10:40:00 | 00:44:00 | LEAVE |
| 003 | 110003 | conf001 | cse003 | 2010-09-01 10:00:00 | 2010-09-01 11:30:25 | 01:20:25 | FORCE-QUIT |
| 004 | 110005 | conf002 | cse005 | 2010-09-12 14:30:00 | 2010-09-12 15:35:25 | 01:05:25 | LEAVE |
| 005 | 110001 | conf002 | cse005 | 2010-09-12 14:30:00 | 2010-09-12 15:40:10 | 01:10:10 | LEAVE |
| 006 | 110002 | conf002 | cse005 | 2010-09-12 14:33:35 | 2010-09-12 15:40:10 | 01:06:35 | LEAVE |
| ... | ... | ... | ... | ... | ... | ... | ... |

FIG.10B

PARTICIPANT HISTORY MANAGEMENT TABLE (t2)

| CONFER-ENCE ID | HOST TERMINAL ID | CONFERENCE START DATE AND TIME | CONFERENCE END DATE AND TIME | CONFERENCE TIME |
|---|---|---|---|---|
| conf001 | 110001 | 2010-09-01 10:00:00 | 2010-09-01 11:30:25 | 01:30:25 |
| conf002 | 110005 | 2010-09-12 14:30:00 | - | - |
| ... | ... | ... | ... | ... |

FIG. 12

USER MANAGEMENT TABLE (Ty)

| CONTRACT NUMBER | USER ID | USER NAME | USER ADDRESS | USER TELEPHONE NUMBER | USER E-MAIL ADDRESS | TERMINAL ID |
|---|---|---|---|---|---|---|
| 20101005-0001 | a123 | AAA | TOKYO… | ⋮ | ⋮ | 11001 |
| | | | | | | 11002 |
| | | | | | | 11003 |
| | | | | | | ⋮ |
| 20110105-0001 | b234 | BBB | OSAKA… | ⋮ | ⋮ | 11011 |
| | | | | | | 11012 |
| | | | | | | 11013 |
| | | | | | | ⋮ |
| 20110110-0001 | c345 | CCC | State of New York… | ⋮ | ⋮ | 11021 |
| | | | | | | 11022 |
| | | | | | | 11023 |
| | | | | | | ⋮ |
| 20110110-0002 | d456 | DDD | Washington, D.C… | ⋮ | ⋮ | 11031 |
| | | | | | | 11032 |
| | | | | | | 11033 |
| | | | | | | ⋮ |
| ⋮ | | | ⋮ | ⋮ | ⋮ | ⋮ |

FIG.15B

SEARCH CONDITION A : (TERMINAL ID = TERMINAL ID OF ACQUISITION REQUESTING TERMINAL) && from_date ≦ PARTICIPATION DATE AND TIME) && (PARTICIPATION DATE AND TIME < to_date)

SEARCH CONDITION B : (TERMINAL ID = TERMINAL ID OF ACQUISITION REQUESTING TERMINAL) && from_date ≦ (LEAVING DATE AND TIME) && (LEAVING DATE AND TIME < to_date)

SEARCH CONDITION C : (TERMINAL ID = TERMINAL ID OF ACQUISITION REQUESTING TERMINAL) && (LEAVING STATE = "DURING CONFERENCE") && (PARTICIPATION DATE AND TIME < to_date)

SEARCH CONDITION D : (TERMINAL ID = TERMINAL ID OF ACQUISITION REQUESTING TERMINAL) && (PARTICIPATION TIME ≦ to_date - from_date) && (PARTICIPATION DATE AND TIME < from_date) && (LEAVING DATE AND TIME ≧ to_date)

FIG.16

TRANSMISSION TERMINAL
SETTING UTILITY SCREEN
1000

TERMINAL ID: 110001     HELP   LOGOUT

MAIN MENU > CONFERENCE HISTORY   1002

CONFERENCE HISTORY (SEPTEMBER, 2010)   1003

◀ [ SEPTEMBER, 2010 ▲ ] ▶   1004

| PARTICI-PATION DATE AND TIME | LEAVING DATE AND TIME | PARTICI-PATION TIME | HOST TERMINAL ID | CONFERENCE START DATE AND TIME | CONFERENCE END DATE AND TIME | CONFERENCE TIME | LEAVING STATE |
|---|---|---|---|---|---|---|---|
| 2010-09-01 10:00:00 | 2010-09-01 11:30:25 | 01:30:25 | 110001 | 2010-09-01 10:00:00 | 2010-09-01 11:30:25 | 01:30:25 | LEAVE |
| 2010-09-02 15:10:00 | 2010-09-02 15:30:40 | 00:20:40 | 110003 | 2010-09-02 14:50:00 | 2010-09-02 16:50:00 | 02:00:00 | LEAVE |
| 2010-09-05 13:00:00 | 2010-09-05 14:00:00 | 01:00:00 | 110002 | 2010-09-05 13:00:00 | 2010-09-05 14:30:00 | 1:30:00 | FORCE-QUIT |
| 2010-09-12 18:01:10 | 2010-09-12 20:30:45 | 02:29:35 | 110005 | 2010-09-12 18:00:00 | 2010-09-12 20:31:00 | 2:31:00 | LEAVE |

FIG.18

| USER ID | TERMINAL ID | TOTAL PARTICIPATION TIME FOR EACH TERMINAL | PARTICIPATION FEE FOR EACH TERMINAL | TOTAL PARTICIPATION FEE FOR EACH USER |
|---|---|---|---|---|
| a123 | 11001 | 21 HOURS 32 MINITES | 12920 YEN | 45020 YEN |
|  | 11002 | 17 HOURS 54 MINITES | 10740 YEN |  |
|  | 11003 | 11 HOURS 10 MINITES | 6700 YEN |  |
|  | ... | ... | ... |  |
| b234 | 11001 | 14 HOURS 47 MINITES | 8870 YEN | 34370 YEN |
|  | 11001 | 12 HOURS 35 MINITES | 7550 YEN |  |
|  | 11001 | 11 HOURS 10 MINITES | 10750 YEN |  |
|  | ... | ... | ... |  |
| c345 | 11001 | 22 HOURS 03 MINITES | 13230 YEN | 38600 YEN |
|  | 11001 | 20 HOURS 45 MINITES | 12450 YEN |  |
|  | 11001 | 15 HOURS 15 MINITES | 9150 YEN |  |
|  | ... | ... | ... |  |
| d456 | 11001 | 8 HOURS 45 MINITES | 5250 YEN | 17820 YEN |
|  | 11001 | 16 HOURS 38 MINITES | 9980 YEN |  |
|  | 11001 | 2 HOURS 45 MINITES | 1650 YEN |  |
|  | ... | ... | ... |  |
| ... | ... | ... | ... | ... |

FIG.19A

PARTICIPATION HISTORY MANAGEMENT TABLE (t11)

| HISTORY ID | TERMINAL ID | CONFERENCE ID | CONFERENCE SESSION ID | PARTICIPATION DATE AND TIME | LEAVING DATE AND TIME | PARTICIPATION TIME | LEAVING STATE | DEFECT FLAG |
|---|---|---|---|---|---|---|---|---|
| 001 | 110001 | conf001 | cse001 | 2010-09-01 10:00:00 | 2010-09-01 11:30:25 | 01:30:25 | LEAVE | 1 |
| 002 | 110002 | conf001 | cse002 | 2010-09-01 10:00:00 | 2010-09-01 10:40:00 | 00:40:00 | LEAVE | 1 |
| 003 | 110003 | conf001 | cse003 | 2010-09-01 10:00:00 | 2010-09-01 11:30:25 | 01:20:25 | FORCE-QUIT | 1 |
| 004 | 110005 | conf002 | cse005 | 2010-09-12 14:30:00 | 2010-09-12 15:35:25 | 01:05:25 | LEAVE | 1 |
| 005 | 110001 | conf002 | cse005 | 2010-09-12 14:30:00 | 2010-09-12 15:40:10 | 01:10:10 | LEAVE | 1 |
| 006 | 110002 | conf02 | cse005 | 2010-09-12 14:33:35 | 2010-09-12 15:40:10 | 01:06:35 | LEAVE | 1 |
| ... | ... | ... | ... | ... | ... | ... | ... | ... |

FIG.19B

CONFERENCE HISTORY MANAGEMENT TABLE (t12)

| CONFERENCE ID | HOST TERMINAL ID | CONFERENCE START DATE AND TIME | CONFERENCE END DATE AND TIME | CONFERENCE TIME | DEFECT FLAG |
|---|---|---|---|---|---|
| conf001 | 110001 | 2010-09-01 10:00:00 | 2010-09-01 11:30:25 | 01:30:25 | 1 |
| conf002 | 110005 | 2010-09-12 14:30:00 | - | - | 1 |
| ... | ... | ... | ... | ... | ... |

TRANSMISSION SYSTEM, PARTICIPATION FEE MANAGEMENT METHOD, COMPUTER PROGRAM PRODUCT, AND MAINTENANCE SYSTEM

INCORPORATION BY REFERENCE

This application is a continuation of U.S. application Ser. No. 14/346,434, filed on Mar. 21, 2014, which claims the benefit of National Stage Application No. PCT/JP12/075868, filed Sep. 28, 2012 and Japanese Application. No. 2011-217053, filed Sep. 30, 2011. The disclosures of the applications referenced above are incorporated herein by reference in their entireties.

TECHNICAL FIELD

The present invention relates to an invention involving management of at least a participation fee, while a communication fee for communication between transmission terminals and the participation fee for participation in a conversation between the transmission terminals are incurred when a conversation is made between among a plurality of transmission terminals.

BACKGROUND ART

In recent years, the number of speakers who make a remote conversation by using a transmission terminal such as a PC (Personal Computer) or a cellular phone is drastically increasing. Not only a conversation between two points (two persons), but a conversation among multiple points (three or more persons) can also be made.

Additionally, an administrator who runs a communication service for a conversation between transmission terminals obtains profits by charging users of transmission terminals of a communication fee. As a method for charging such a communication fee, there is disclosed a method for equally charging speakers (participants) who take part in a conversation of a fee for communication from the start to the end of the conversation (see Japanese Patent Application Laid-open No. 09-172509).

However, for example, another speaker may take part in a conversation using another transmission terminal during the conversation between two points, or a speaker using a given transmission terminal used for the conversation may leave the conversation during the conversation among multiple points. In such cases, there is a problem that the speaker is charged with a same fee of communication from the start to the end of the conversation even though the speaker did not take part in the actual conversation. This causes the inequality in charged fee.

DISCLOSURE OF INVENTION

According to an embodiment, a transmission system includes: a transmission management system that manages participation time information indicating a participation time in which a conversation is participated using a given transmission terminal; and a fee management system that manages participation fee information indicating a participation fee incurred when the conversation is participated using the transmission terminal. The transmission management system includes a transmission unit that transmits the participation time information for each transmission terminal to the fee management system through a communication network. The fee management system includes: a user management unit that manages user identification information for identifying a user of the transmission terminal and terminal identification information for identifying the transmission terminal used by the user in a manner linked to each other; a reception unit that receives the participation time information transmitted from the transmission management system; a participation time calculation unit that calculates a total participation time in which conversation is made using each transmission terminal based on the received participation time information; a participation fee calculation unit that calculates a participation fee for each transmission terminal based on the calculated total participation time; and a participation fee summing unit that refers to the user management unit, sums up participation fees of each transmission terminal indicated by the corresponding terminal identification information for each user identification information, and calculates a total participation fee for each user.

According to another embodiment, provided is a participation fee management method for a transmission system that includes: a transmission management system that manages participation time information indicating a participation time in which conversation is participated using a given transmission terminal; and a fee management system that manages participation fee information indicating a participation fee incurred when the conversation is participated using the transmission terminal and includes a user management unit that manages user identification information for identifying a user of the transmission terminal and terminal identification information for identifying the transmission terminal used by the user in a manner linked to each other. The method, executed by the transmission management system, includes: transmitting the participation time information to the fee management system through a communication network for each transmission terminal; receiving the participation time information transmitted from the transmission management system; participation time calculating that includes calculating a total participation time in which conversation is made by each transmission terminal based on the received participation time information; participation fee calculating that includes calculating a participation fee for each transmission terminal based on the calculated total participation time; and participation fee summing that includes referring to the user management unit, summing up each participation fee of the transmission terminal indicated by the corresponding terminal identification information for each user identification information, and calculating a total participation fee for each user.

According to still another embodiment, provided is a non-transitory computer program product, of which program code stored therein when executed, causing a computer to execute the method mentioned above.

According to still another embodiment, provided is a maintenance system that performs maintenance for the transmission management system or the fee management system mentioned above.

BRIEF DESCRIPTION OF DRAWINGS

FIG. 2 is a conceptual diagram illustrating a state in which image data, voice data, and various management information are transmitted/received in the transmission system;

FIG. 3 is a conceptual diagram illustrating an image quality of image data;

FIG. 7 is a functional block diagram of the transmission management system according to this embodiment;

FIG. 8 is a conceptual diagram illustrating a processing rule management table;

FIG. 9 is a conceptual diagram illustrating fresh history information;

FIG. 10A is a conceptual diagram illustrating a participant history management table;

FIG. 10B is a conceptual diagram illustrating a conference history management table;

FIG. 12 is a conceptual diagram illustrating a user management table;

FIG. 16 is a diagram illustrating an exemplary screen displayed on a display of an external input device;

FIG. 18 is a conceptual diagram illustrating a list of participation fees;

FIG. 19A is a conceptual diagram illustrating a participant history management table; and FIG. 19B is a conceptual diagram illustrating a conference history management table.

BEST MODE(S) FOR CARRYING OUT THE INVENTION

Figure 1:
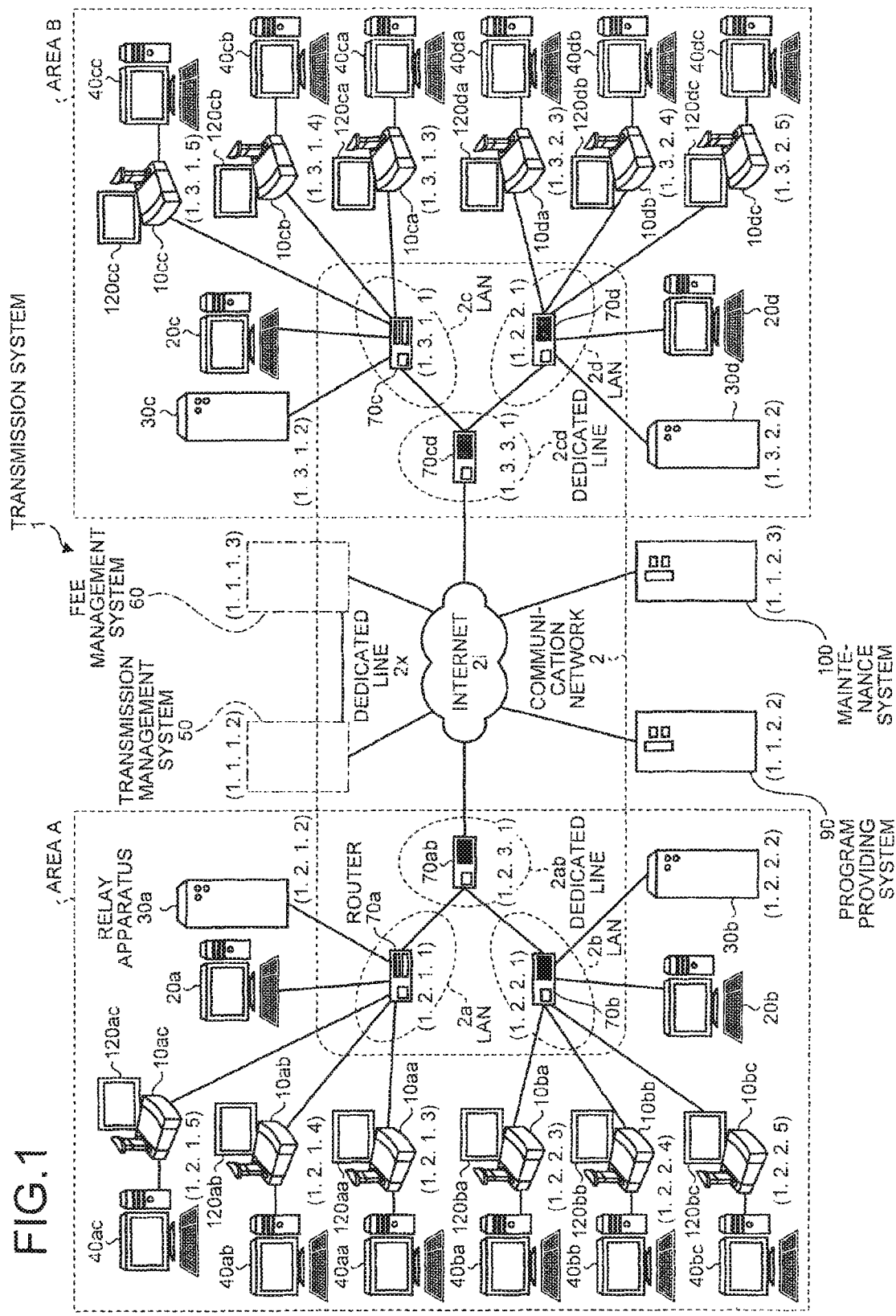
FIG. 1 is a schematic diagram of a transmission system according to an embodiment.

Hereinafter, embodiments will be described with reference to the drawings. FIG. 1 is a schematic view of a transmission system according to an embodiment. This transmission system 1 includes a data providing system which transmits content data in one direction from one transmission terminal to the other transmission terminal through a transmission management system 50, and a communication system which transmits information, emotion, or the like among the plurality of transmission terminals through the transmission management system. This communication system is a system for mutually transmitting information, emotion, or the like among a plurality of communication terminals (corresponding to "transmission terminals") through the communication management system (corresponding to "transmission management system"). Examples of the communication system include a television conference system and a video telephone system.

In this embodiment, a transmission system, a transmission management system, a transmission terminal, and the like will be described assuming that a television conference system is illustrated as an example of the communication system, a television conference management system is illustrated as an example of the communication management system, and a television conference terminal is illustrated as an example of the communication terminal. That is, the transmission terminal and the transmission management system are applied not only to a television conference system, but also to a communication system or a transmission system. Note that in this embodiment, "television conference" herein described is also called "video conference", and both terms indicate the same thing.

Configuration of Embodiment

This embodiment illustrates a case where users of the transmission system 1 are in four offices, i.e., Tokyo office, Osaka office, New York office, and Washington D.C. office.

Referring to FIG. 1, the terminals and the like located at an inner side of the network than a router 70a are managed by Tokyo office; the terminals and the like located at an inner side of the network than a router 70b are managed by Osaka office; the terminals and the like located at an inner side of; the network than a router 70c are managed by New York office; and the terminals and the like located at an inner side of a router 70d are managed by Washington D.C. office.

Among them, a plurality of speakers (participants) that makes conversation with other transmission terminals by using transmission terminals (10aa, 10ab, 10ac, . . . ) belongs to Tokyo office serving as a user. These speakers are, for example, employees of the user.

One or more use managers who manage the transmission terminals (10aa, 10ab, 10ac, . . . ) and use the user terminal 20 that receives charging of a participation fee from a fee management system 60, which is described later, belong to Tokyo office serving as a user. Also, a plurality of speakers and one or more use managers belong to the respective offices of Osaka office, New York office, and Washington D.C. office.

In this embodiment, in addition to the communication fee incurred by the communication between the transmission terminals, a participation fee is incurred when the user of the transmission terminal participates in the conversation using the transmission system 1. Among them, a fee plan including a communication fee for packets charged by an electronic communication company is provided to allow communication in which packets are unlimitedly used at a constant monthly fee at present. The participation fee is a total fee incurred by the participation in the conversation made by each speaker with another speaker by using a transmission terminal. The participation fee is charged to each user by the administrator of the transmission system 1. That is, in this embodiment, the participation fee is not necessarily charged to each speaker belonging to the user or each transmission terminal of the user.

This embodiment assumes a case where each user pays the participation fee and the communication fee separately. Note that users may belong to different offices, or companies or persons may be different from each other.

The transmission system 1 shown in FIG. 1 includes transmission terminals (10aa, 10ab, . . . ) used by the plurality of speakers, user terminals (20a, 20b, 20c, 20d) used by use managers, displays (120aa, 120ab, . . . ) for each of the transmission terminals (10aa, 10ab, . . . ), external input devices (40aa, 40ab, . . . ) each serving as a client PC (Personal Computer), a plurality of relay apparatus (30a, 30b, 30c, 30d), a transmission management system 50, a fee management system 60, a program providing system 90, and a maintenance system 100. The plural transmission terminals 10 receive and transmit image data and voice data which are exemplary content data.

Note that in the following, a given transmission terminal among the plurality of transmission terminals (10aa, 10ab, . . . ) is represented as "terminal 10", and a given terminal among the plurality of user terminals (20a, 20b, . . . ) is represented as "terminal 20". A given display among the plurality of displays (120aa, 120ab, . . . ) is represented as "display 120", and a given external input device among the plurality of external input devices (40aa, 40ab, . . . ) is represented as "external input device 40". A given relay apparatus among the plurality of relay apparatuses (30a, 30b, 30c, 30d) is represented as "relay apparatus 30". Further, a terminal serving as a request source that requests starting a television conference is represented as "requesting terminal", and a terminal serving as a destination (relay destination) of a request destination is represented as "destination terminal".

FIG. 2 is a conceptual diagram illustrating a state where image data, voice data, and various management information are transmitted/received in the transmission system. As shown in FIG. 2, in the transmission system 1, a management information session "sei" is established to transmit/receive various management information between a requesting terminal and a destination terminal through the transmission management system 50. Further, four sessions for transmitting and receiving four data items, i.e., image data having a high resolution, image data having an intermediate resolution, image data having a low resolution, and voice data, are established between the requesting terminal and the destination terminal through the relay apparatus 30. Here, these four sessions are collectively represented as an image/voice data session "sed".

Referring now to FIG. 3, the resolution of each image of the image data to be handled in this embodiment will be described. FIG. 3 is a conceptual diagram illustrating the image quality of the image data. FIG. 3(a) illustrates an image having a low resolution and serving as a base image with 160 pixels in breadth and 120 pixels in length; FIG. 3(b) illustrates an image having an intermediate resolution and having 320 pixels in breadth and 240 pixels in length; and FIG. 3(c) illustrates an image having a high resolution and having 640 pixels in breadth and 480 pixels in length. Among them, in the case of routing a narrow-band path, image data having a low image quality, which is consisting only of image data having a low resolution and serving as a base image, is relayed. When the bandwidth is relatively wide, image data having a low resolution and serving as a base image and image data having an intermediate image quality which is made of image data having an intermediate resolution are relayed. Further, when the bandwidth is extremely wide, the image data having a low resolution and having a base image quality, the image data having an intermediate resolution, and the image data having a high image quality which is made of image data having a high resolution are relayed. Note that images of the image data may be one or both of a moving image and a still image.

The relay apparatus 30 shown in FIG. 1 relays content data among the plurality of terminals 10.

The transmission management system 50 manages in an integrated manner the login authentication from the terminal 10, the call state of the terminal 10, the destination list, the communication history, the communication status of the relay apparatus 30, and the like. Note that the transmission management system 50 will be described in detail later.

The fee management system 60 is a characteristic part of this embodiment. The fee management system 60 calculates a participation fee for each user, and performs fee management for charging the participation fee for each user. Note that the fee management system 60 will be described in detail later. The fee management system 60 may calculate the participation fee as well as the communication fee described above, and may perform fee management for charging the communication fee for each user.

The plurality of routers (70a, 70b, 70c, 70d, 70ab, 70cd) select an appropriate route for image data and voice data. Hereinafter, a given router among the routers (70a, 70b, 70c, 70d, 70ab, 70cd) is represented as "router 70".

The program providing system 90 includes and an HD (Hard Disk) 204 which is described later. This stores a program for terminal that causes the terminal 10 to implement various functions (or causes the terminal 10 to function as various means), and transmits the program for terminal to the terminal 10. The HD 204 of the program providing system 90 also stores a program for relay apparatus that causes the relay apparatus 30 to implement various functions (or causes the relay apparatus 30 to function as various means), and transmits the program for relay apparatus to the relay apparatus 30.

Further, the HD 204 of the program providing system 90 also stores a program for transmission management that causes the transmission management system 50 to implement various functions (or causes the transmission management system 50 to function as various means), and transmits the program for transmission management to the transmission management system 50. The HD 204 of the program providing system 90 also stores a fee management program for causing the fee management system 60 to implement various functions (or causing the fee management system 60 to function as various means), and transmits the fee management program to the fee management system 60.

The maintenance system 100 is a computer that performs retention, management, or maintenance of at least one of the terminal 10, the relay apparatus 30, the transmission management system 50, the fee management system 60, and the program providing system 90. For example, when the maintenance system 100 is placed within the country and the terminal 10, the relay apparatus 30, the transmission management system 50, the fee management system 60, or the program providing system 90 is placed outside the country, the maintenance system 100 remotely performs maintenance, such as retention, management, or maintenance, of at least one of the terminal 10, the relay apparatus 30, the transmission management system 50, the fee management system 60, and the program providing system 90 through a communication network 2. The maintenance system 100 also performs maintenance, such as management of the model number, production number, sale destination, maintenance inspection, or failure history, of at least one of the terminal 10, the relay apparatus 30, the transmission management system 50, the fee management system 60, and the program providing system 90, without involving the communication network 2.

Incidentally, the terminals (10aa, 10ab, . . . ), the relay apparatus 30a, and the router 70a are connected together with a LAN 2a so as to communicate with each other. The terminals (10aa, 10ab, . . . ) are respectively connected with the external input devices (40aa, 40ab, . . . ) so as to communicate with each other. The terminals (10ba, 10bb, . . . ), the relay apparatus 30b, and the router 70b are connected together with a LAN 2b so as to communicate with each other. The terminals (10ba, 10bb, . . . ) are connected to the respective external input devices (40ba, 40bb, . . . ) so as to communicate with each other. The LAN 2a and LAN 2b are connected together with a dedicated line 2ab including a router 70ab so as to communicate with each other, and are constructed within a given area A. For example, the area A is Japan. As described above, the LAN 2a is constructed within Tokyo office, and the LAN 2b is constructed within Osaka office.

On the other hand, the terminals (10ca, 10cb, . . . ), the relay apparatus 30c, and the router 70c are connected with a LAN 2c so as to communicate with each other. The terminals (10ca, 10cb, . . . ) are connected with the respective external input devices (40ca, 40cb, . . . ) so as to communicate with each other. The terminals 10 (10da, 10db . . . ), the relay apparatus 30d, and the router 70d are connected with a LAN 2d so as to communicate with each other. The terminals (10da, 10db, . . . ) are connected with the respective external input devices (40da, 40db, . . . ) so as to communicate with each other. The LAN 2c and LAN 2d are connected with a dedicated line 2cd including a router 70cd so as to communicate with each other, and are constructed within a given area B. For example, the area B is the United States. As described above, the LAN 2c is constructed within New York office, and the LAN 2d is constructed within Washington D.C. office. The area A and the area B are connected from the routers (70ab, 70cd) through an Internet 2i so as to communicate with each other. Further, the transmission management system 50 and the fee management system 60 are connected with a dedicated line 2x so as to communicate with each other.

The transmission management system 50, the fee management system 60, the program providing system 90, and the maintenance system 100 are connected with the terminal 10 and the relay apparatus 30 through the Internet 2i so as to communicate with each other. The transmission management system 50, the fee management system 60, the program providing system 90, and the maintenance system 100 may be placed in the area A or area B, or may be placed in an area other than these areas.

Note that in this embodiment, the communication network 2 is constructed by the LAN 2a, the LAN 2b, the dedicated line 2ab, the Internet 2i, the dedicated line 2cd, the dedicated line 2x, the LAN 2c, and the LAN 2d. This communication network 2 may include a section where a wire communication as well as radio communication such as WiFi (Wireless Fidelity) or Bluetooth (registered trademark) is performed.

In FIG. 1, a group of four numbers shown below each of the terminal 10, the relay apparatus 30, the transmission management system 50, the fee management system 60, the router 70, the program providing system 90, and the maintenance system 100 simply represents an IF address in a typical IPv4. A group of four numbers shown below the fee management system 60 simply represents an IF address in IPv4. For example, the IF address of the terminal 10aa is "1.2.1.3". Though IPv6 may be used instead of IPv4, the following description is made using IPv4 for simplification of the explanation.

Note that each terminal 10 may be used not only in a call between a plurality of offices or a call between different rooms within the same office, but may be used in a call in the same room or a call between an outdoor place and an indoor place, or vice versa. When each terminal 10 is used outdoors, communication is carried out by radio such as a cellular phone communication network.

Hardware Configuration of Embodiment

Figure 4:
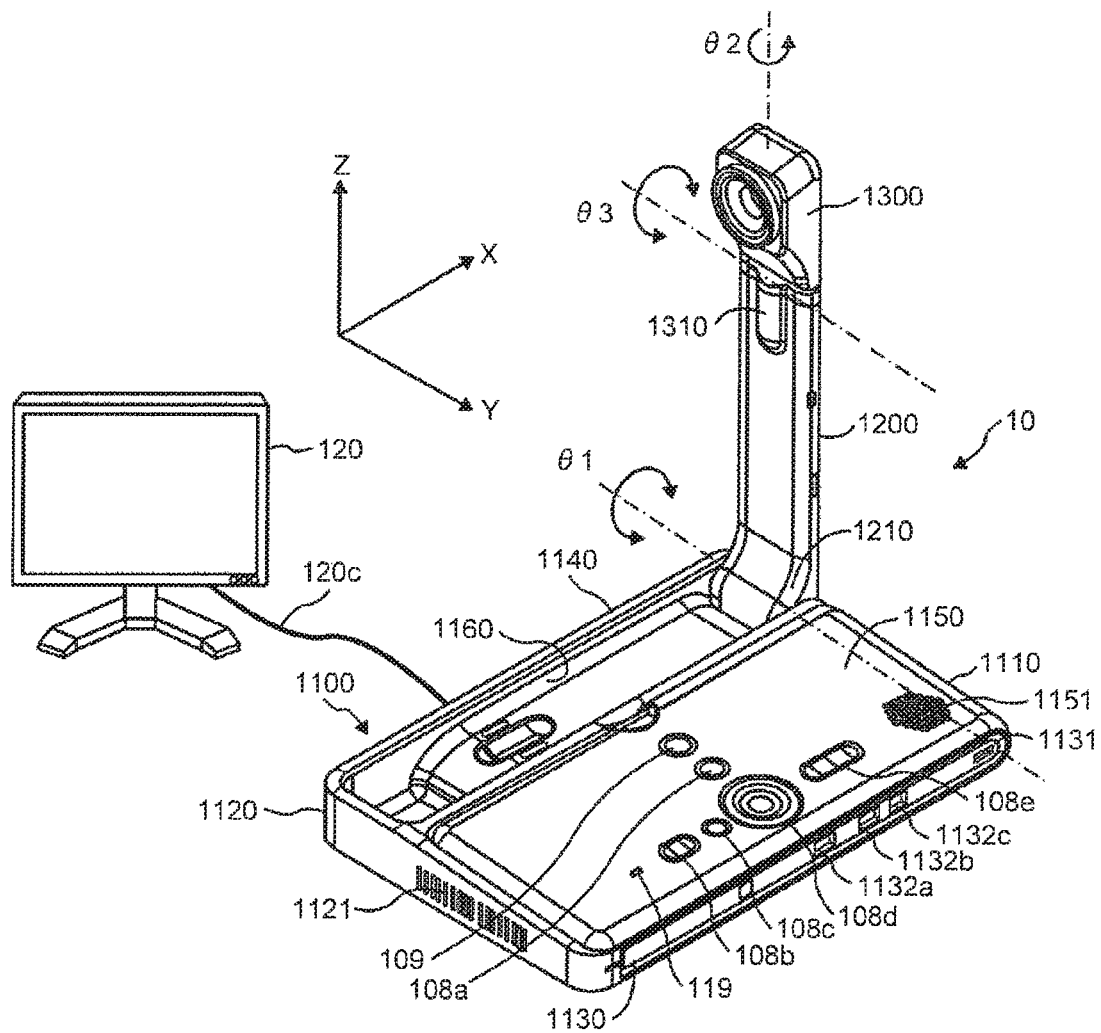
FIG. 4 is an appearance diagram of a transmission terminal according to this embodiment.

First, a hardware configuration of this embodiment will be described. FIG. 4 is an appearance diagram of the terminal 10 according to this embodiment. The following description is made assuming that the longitudinal direction of the terminal 10 is an X-axis direction, a direction perpendicular to the X-axis direction in the horizontal plane is a Y-axis direction, and a direction (vertical direction) perpendicular to each of the X-axis direction and the Y-axis direction is a Z-axis direction.

As shown in FIG. 4, the terminal 10 includes a housing 1100, an arm 1200, and a camera housing 1300. Among them, a front-side wall surface 1110 of the housing 1100 is provided with an inspiration surface that is not shown and formed by a plurality of inspiration holes. A back-side wall surface 1120 of the housing 1100 is provided with an exhaust surface 1121 having a plurality of exhaust holes formed therein. In this configuration, driving a cooling fan incorporated in the housing 1100 enables intake of external air at the back of the terminal 10 through an inspiration surface, which is not shown, and exhaust of the air to the back side of the terminal 10 through the exhaust surface 1121. A right-side wall surface 1130 of the housing 1100 has a sound pickup hole 1131, which allows a built-in microphone 114, which is described later, to pick up sound such as voice, sound, or noise.

An operation panel 1150 is formed on the side of the right-side wall surface 1130 of the housing 1100. This operation panel 1150 is provided with a plurality of operation buttons (108a to 108e), which is described later, a power supply switch 109, which is described later, and an alarm lamp 119, which is described later, and has a sound output surface 1151 formed by a plurality of voice output holes for allowing output sound from a built-in speaker 115, which is described later, to pass through. A housing portion 1160 which is a recess for housing the arm 1200 and the camera housing 1300 is formed on the side of a left-side wall surface 1140 of the housing 1100. The right-side wall surface 1130 of the housing 1100 is provided with a plurality of connection ports (1132a to 1132c) for electrically connecting a cable to an external device connection I/F 118 which is described later. On the other hand, the left-side wall surface 1140 of the housing 1100 is provided with a connection port, which is not shown, for electrically connecting a cable 120c for the display 120 to the external device connection. I/F 118 which is described later.

Hereinafter, the term "operation button 108" is used to indicate a given operation button among the operation buttons (108a to 108e), and the term "connection port 1132" is used to indicate a given connection port among the connection ports (1132a to 1132c).

Next, the arm 1200 is mounted to the housing 1100 through a torque hinge 1210, and is configured to be rotatable in the vertical direction in the range of a tilt angle θ1 of 135 degrees with respect to the housing 1100. FIG. 4 illustrates a state where the tilt angle θ1 is 90 degrees. The camera housing 1300 is provided with a built-in camera 112, which is described later, and is capable of capturing images of users, documents, rooms, and the like. The camera housing 1300 has a torque hinge 1310. The camera housing 1300 is mounted to the arm 1200 through the torque hinge 1310. The camera housing 1300 is mounted to the arm 1200 through the torque hinge 1310. The camera housing 1300 is configured to be rotatable in the vertical and horizontal directions within a pan angle of θ2 of ±180 degrees and a tilt angle θ3 of ±45 degrees, assuming that the state shown in FIG. 4 is 0 degrees, with respect to the arm 1200.

Note that each system forming the relay apparatus 30 and the transmission management system 50, each system forming the fee management system 60, the program providing system 90, and the maintenance system 100 have the same appearance as that of a typical server/computer, so the description of the appearance thereof is omitted.

Figure 5:
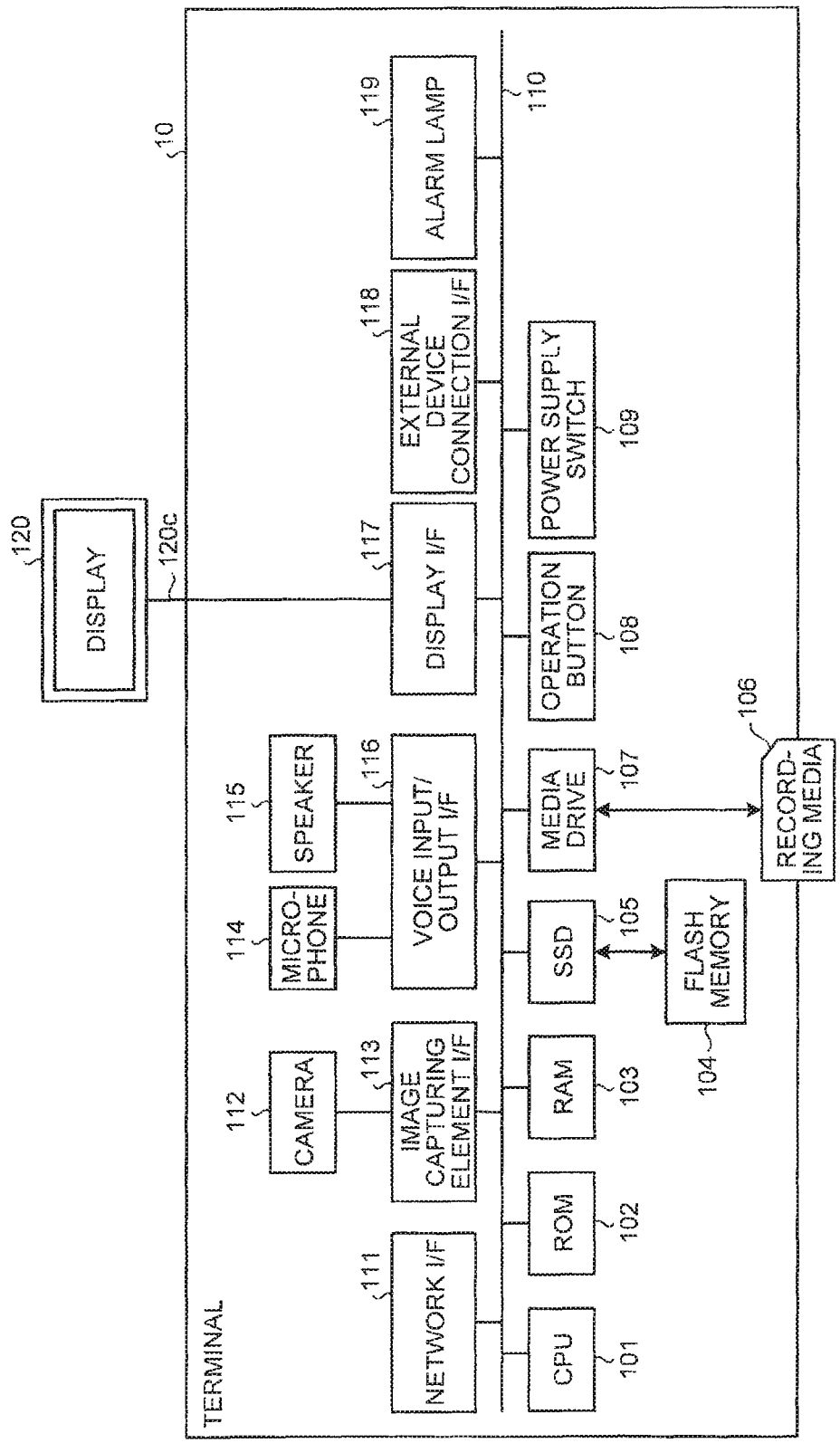
FIG. 5 is a hardware configuration diagram of the transmission terminal according to this embodiment.

FIG. 5 is a hardware configuration diagram of the terminal 10 according to this embodiment. As shown in FIG. 5, the terminal 10 of this embodiment includes a CPU (Central Processing Unit) 101 that controls the overall operation of the terminal 10; a ROM (Read Only Memory) 102 that stores programs for use in driving the CPU 101, such as IPL (Initial Program Loader); a RAM (Random Access Memory) 103 for use as a workarea of the CPU 101; a flash memory 104 that stores various data such as a program for terminal, image data, and voice data; an SSD (Solid State Drive) 105 that controls reading or writing of various data with respect to the flash memory 104 in accordance with the control of the CPU 101; a media drive 107 that controls reading or writing (storage) of data with respect to a recording media 106 such as a flash memory; operation buttons 108 to be operated during selection of a destination of the terminal 10, for example; a power supply switch 109 for switching ON/OFF of the power supply of the terminal 10; and a network I/F (Interface) 111 for transmitting data by using the communication network 2.

The terminal 10 includes the built-in camera 112 that captures an image of a subject in accordance with the control of the CPU 101 to thereby obtain image data; an image capturing element I/F 113 that controls driving of the camera 112; the built-in microphone 114 that receives voice; the built-in speaker 115 that outputs voice; a voice input/output I/F 116 that processes the input and output of voice signals between the microphone 114 and the speaker 115 in accordance with the control of the CPU 101; a display I/F 117 that transmits image data to the externally-mounted display 120 in accordance with the control of the CPU 101; an external device connection I/F 118 for connecting various external devices; an alarm lamp 119 that notifies abnormalities occurring in various functions of the terminal 10; and a bus line 110, such as an address bus and a data bus, for electrically connecting each of the components described above as shown in FIG. 5.

The display 120 is a display unit that is formed of a liquid crystal or organic EL that displays an image of a subject, an operation icon, and the like. The display 120 is connected to the display I/F 117 with the cable 120c. This cable 120c may be a cable for analog RGB (VGA) signals, a cable for component video, or a cable for HDMI (High-Definition Multimedia Interface) and DVI (Digital Video interactive) signals.

The camera 112 includes a lens and a solid-state image capturing element that converts light into electric charges to thereby convert an image (video) of a subject into electronic data. A CMOS (Complementary Metal Oxide Semiconductor), a CCD (Charge Coupled Device), or the like is used as the solid-state image capturing element.

The external device connection I/F 118 can be electrically connected with external devices, such as an externally-equipped camera, and externally-equipped microphone, and an externally-equipped speaker, with a USB (Universal Serial Bus) cable or the like to be inserted into the connection port 1132 of the housing 1100 shown in FIG. 4. When the externally-equipped camera is connected, the externally-equipped camera is driven in preference to the built-in camera 112 in accordance with the control of the CPU 101. Similarly, when the externally-equipped microphone is connected or the externally-equipped speaker is connected, the externally-equipped microphone and the externally-equipped speaker are driven in preference to the built-in microphone 114 and the built-in speaker 115, respectively, in accordance with the control of the CPU 101.

Note that the recording media 106 is detachably mounted to the terminal 10. Not only the flash memory 104, but also an EEPROM (Electrically Erasable and Programmable ROM) or the like may be used, as long as the memory is a non-volatile memory that reads or writes data in accordance with the control of the CPU 101.

Further, the program for terminal is a file of an installable format or executable format, and may be distributed in a form recorded in a computer-readable recording media (recording media 106 and the like). The program for terminal may be stored not in the flash memory 104 but in the ROM 102.

Figure 6:
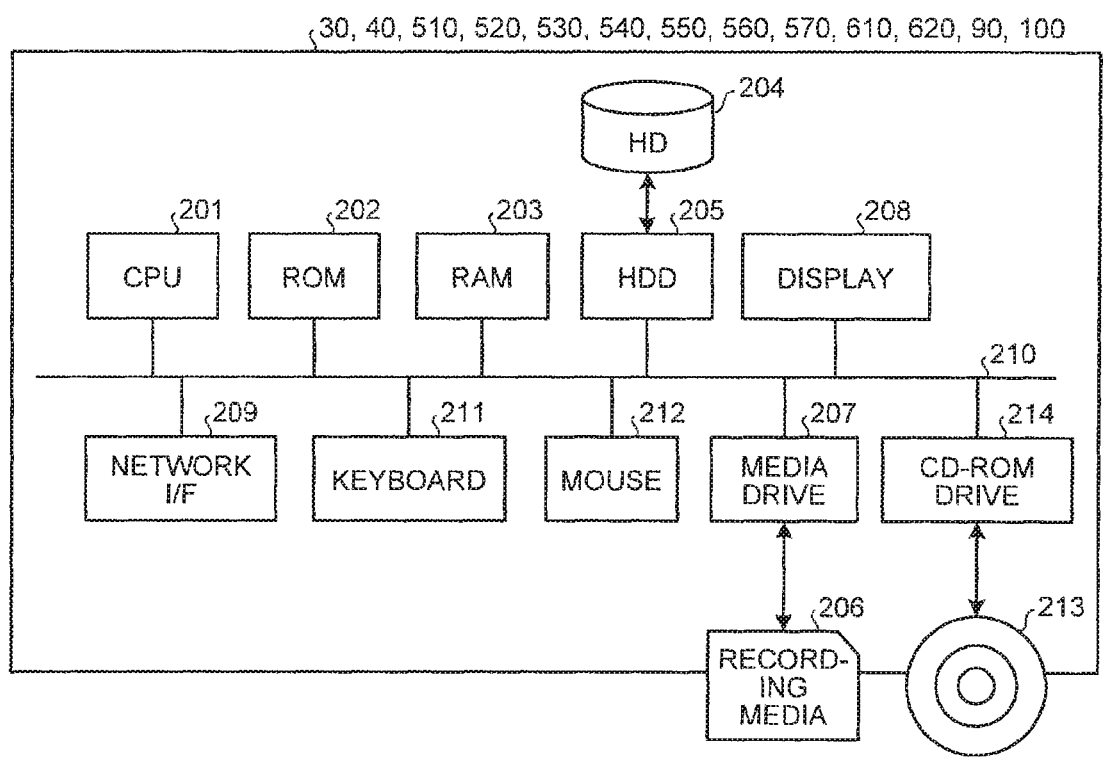
FIG. 6 is a hardware configuration diagram illustrating a transmission management system, a relay apparatus, a program providing server, or a maintenance system according to this embodiment.

FIG. 6 is a hardware configuration diagram of the transmission management system according to this embodiment. The transmission management system 50 includes a CPU 201 that controls the overall operation of the transmission management system 50; a ROM 202 that stores programs for use in driving the CPU 201 such as an IPL; a RAM 203 used as a workarea of the CPU 201; the HD 204 that stores various data such as a program for transmission management; an HDD (Hard Disk Drive) 205 that controls reading or writing of various data with respect to the HD 204 in accordance with the control of the CPU 201; a media drive 207 that controls reading or writing (storage) of data with respect to a recording media 206 such as a flash memory; a display 208 that displays various information such as a cursor, a menu, a window, characters, or images; a network I/F 209 for transmitting data by using the communication network 2; a keyboard 211 including a plurality of keys for inputting characters, numerical values, various instructions, and the like; a mouse 212 that selects or executes various instructions, selects a process target, and moves a cursor, for example; a CD-ROM drive 214 that controls reading or writing of various data with respect to a CD-ROM (Compact Disc Read Only Memory) 213 as an example of the detachable recording medium; and a bus line 210, such as an address bus and a data bus, for electrically connecting each of the components described above as shown in FIG. 6.

Note that the program for transmission management is a file of an installable format or an executable format, and may be distributed in a form recorded in computer-readable recording media such as the recording media 206 or the CD-ROM 213. The program for transmission management may be stored not in the HD 204 but in the ROM 202.

The relay apparatus 30 has a hardware configuration similar to that of the transmission management system 50, so the description thereof is omitted. Note that the HD 204 records a program for relay apparatus for use in controlling the relay apparatus 30. Also in this case, the program for relay apparatus is a file of an installable format or an executable format, and may be distributed in a form recorded in computer-readable recording media such as the recording media 206 or the CD-ROM 213. The program for relay apparatus may be stored not in the HD 204 but in the ROM 202.

The external input device 40 has a hardware configuration similar to that of the transmission management system 50, so the description thereof is omitted. Note that the HD 204 records a program for external input device for use in controlling the external input device 40. Also in this case, the program for external input device is a file of an installable format or an executable format, and may be distributed in a form recorded in computer-readable recording media such as the recording media 206 or the CD-ROM 213. The program for external input device may be stored not in the HD 204 but in the ROM 202.

The program providing system 90 has a hardware configuration similar to that of the transmission management system 50, so the description thereof is omitted. Note that the HD 204 records a program for program providing system for use in controlling the program providing system 90. Also in this case, the program for program providing system is a file of an installable format or an executable format, and may be distributed in a form recorded in computer-readable recording media such as the recording media 206 or the CD-ROM 213. The program for program providing system may be stored not in the HD 204 but in the ROM 202.

The maintenance system 100 has a hardware configuration similar to that of the transmission management system 50, so the description thereof is omitted. Note that the HD 204 records a program for maintenance system for use in controlling the maintenance system 100. Also in this case, the program for maintenance system is a file of an installable format or an executable format, and may be distributed in a form recorded in computer-readable media such as the recording media 206 or the CD-ROM 213. The program for maintenance system may be stored not in the HD 204 but in the ROM 202.

Note that as other examples of the detachable recording media, computer-readable recording media, such as a CD-R (Compact Disc Recordable), a DVD (Digital Versatile Disk), and a Blue-ray disc, may also be provided.

Functional Configuration of Embodiment

Next, the functional configuration of each of the transmission management system 50 and the fee management system 60 of this embodiment will be described. Note that the description of the functions of the terminal 10, the relay apparatus 30, the external input device 40, the router 70, the program providing system 90, and the maintenance system 100 is omitted.

Transmission Management System

FIG. 7 is a functional block diagram of the transmission management system 50 of this embodiment. As shown in FIG. 7, the transmission management system 50 is constructed by a communication management server 510, a temporary storage server 520, a plurality of processing servers ($530_1$, $530_2$, . . . , $530_N$) (N is a positive number), a history management server 540, a terminal setting utility server 550, a charging history generation server 560, and a file transfer server 570. These servers are connected together with a LAN 590 so as to communicate with each other and are connected with an Internet 2i through a LAN 590.

Note that each server constructing the transmission management system 50 includes a hardware configuration similar to that of the transmission management system 50 described above, so the description thereof is omitted. A given processing server among the plurality of processing servers ($530_1$, $530_2$, . . . , $530_N$) is represented as "processing server 530". The file transfer server 570 is also connected to the dedicated line 2x.

Communication Management Server

Subsequently, the characteristic functions of the communication management server 510 will be described. The communication management server 510 includes a transmission/reception unit 511 and a communication control unit 512.

Among them, the transmission/reception unit 511 is a function or means that is executed by the command from the CPU 201 shown in FIG. 6 and the network I/F 209 shown in FIG. 6. This transmission/reception unit 511 transmits/receives various data (or information) to/from another terminal, device, server, or system through the communication network 2 including the LAN 590 and the Internet 2i. For example, the transmission/reception unit 511 receives fresh history information indicating a history about communication in each terminal 10 from each terminal 10 through the Internet 2i and the LAN 590.

Note that this fresh history information is information indicating a history (log) about the communication state in each terminal 10, and is fresh information obtained before the processing described later. FIG. 9 illustrates an example of setting of fresh history information. Each fresh history information is displayed for each record of the schema shown in FIG. 9. The fresh history information is formed of the attributes of a communication state, a requesting terminal ID, a destination terminal ID, a session ID, a conference ID, conference session ID, and communication date and time.

Among these attributes, the attribute "communication state" represents the type of the communication content of the terminal 10. Among the communication states, the communication state "online" indicates that the power supply of the terminal 10 is turned on. The communication state "offline" indicates that the power supply of the terminal is turned off (when off-line occurs daring a conference, values are also stored in the conference ID and the conference session ID). The communication state "invite" indicates a request for invitation to a conference. The communication state "call" indicates a request for participating in the conference being held. The communication state "accept" indicates permission to the invitation request (invite) or participation request (call). The communication state "start" indicates start of the conference. The communication state "end" indicates end of the conference. The communication state "join" indicates that the terminal 10 participates in the conference. The communication state "leave" indicates that the terminal 10 leaves the conference.

The attribute "requesting terminal ID" indicates an ID (Identification) for identifying the requesting terminal, as an example of a requesting terminal identification information. The attribute "destination terminal ID" indicates an ID for identifying a destination terminal, as an example of the destination terminal identification information. The attribute "session ID" indicates an ID for specifying a session from an on-line state to an off-line state. The attribute "conference ID" is an ID for specifying a conference. The attribute "conference session ID" is an ID for specifying a conference session from the time when the terminal 10 participates in the conference and the time when the terminal 10 leaves the conference. For example, when the terminal 10 participates in the same conference a plurality of times after a while and thereafter leaves the conference, the conference session ID illustrates different values. The attribute "communication date and time" is date and time when the communication in the communication state described above is carried out by the terminal 10.

Note that the attributes and the communication states are examples only, and data items or values other than the attributes and communication states may be included. In this example, the attributes are clearly defined as shown in the DB table, but the fresh history information may include various items. Accordingly, only the text data items such as JSON (JavaScript Object Notation) and XML (Extensible Markup Language) may be included.

The communication control unit 512 is a function or means that is executed by the command from the CPU 201 shown in FIG. 6, and controls the transmission/reception unit 511 to communicate each terminal 10 by the management information session sei shown in FIG. 2. For example, the communication control unit 512 performs control and management for communication with each terminal 10, control and management for receiving the fresh history information from each terminal 10, and control and management for transmitting processed history information, which is described later, to the terminal 10 having requested acquisition of the processed history information. Note that the terminal 10 that requests acquisition of the processed history information as described above is represented as "acquisition requesting terminal".

Temporary Storage Server

Next, the characteristic functions of the temporary storage server 520 will be described. The temporary storage server 520 includes a transmission/reception unit 521 and a temporary storage unit 529.

Among them, the transmission/reception unit 521 is a function or means that is executed by the command from the CPU 201 shown in FIG. 6 and by the network I/F 209 shown in FIG. 6. This transmission/reception unit 521 transmits/receives various data (or information) with another server through the LAN 590. For example, the transmission/reception unit 521 receives fresh history information indicating the history regarding the communication in each terminal 10 from the transmission/reception unit 511 of the communication management server 510 through the LAN 590.

The transmission/reception unit 521 transmits the fresh history information stored in the temporary storage unit 529 to the processing server 530 through the LAN 590. The transmission/reception unit 521 receives the fresh history information returned from the processing server 530.

The temporary storage unit 529 is formed by the HD 204 and the HDD 205 shown in FIG. 6. This temporary storage unit 529 temporarily stores the received fresh history information by using the transmission/reception unit 511, or loads the stored fresh history information to the transmission/reception unit.

Processing Server

Next, the characteristic functions of the processing server 530 will be described. Note that FIG. 8 is a conceptual diagram illustrating a processing rule management table. FIG. 9 is a conceptual diagram illustrating fresh history information. FIG. 10A is a conceptual diagram illustrating a participation history management table. FIG. 10B is a conceptual diagram illustrating a conference history management table. In this embodiment, separately providing the temporary storage server 520 and the processing server 530 avoids a state in which the fresh history information cannot be received by the transmission management system 50 until the processing of the processing server 530 is finished. Further, the use of a plurality of processing servers 530 enables the processing servers 530 to process a plurality of fresh history information items in a distributed manner, thereby achieving distribution of processing load.

The processing server 530 includes a transmission/reception unit 531, a processing unit 532, and a processing rule management unit 539. The transmission/reception unit 531 is a function or means that is executed by the command from the CPU 201 shown in FIG. 6, and by the network I/F 209 shown in FIG. 6.

Among them, the transmission/reception unit 531 transmits/receives various data (or information) with another server through the LAN 590.

The processing rule management unit 539 is constructed by the HD 204 and the HDD 205 shown in FIG. 6. This processing rule management unit 539 is formed of a processing rule management table (T) that correlates communication state information indicating the communication state of a given terminal 10 with processing information indicating the process content of processing. As shown in FIG. 8, this processing rule management table (T) includes attributes (fields) of a processing start condition indicating a communication state, a post-processing target table, post-processing target record, and a processing content.

Among them, the attribute "processing start condition" indicates a condition for the processing unit to start processing in accordance with the processing content. The processing start condition varies depending on the "communication state", "conference ID", and "conference session ID" shown in FIG. 9 as described later.

The attribute "post-processing target table" specifies each table (t1, t2) after the processing shown in FIGS. 10A and 2. The attribute "post-processing target table" specifies a given record of each table (t1, t2) after the processing shown in FIGS. 10A and 2.

The attribute "processing content" indicates the content of a processing in which the processing unit 532 processes fresh history information into processed history information, by indicating the correspondence between a specific item within the fresh history information and a specific item within the processed history information.

In the processing rule management table (T), when there is no post-processing target record, the processing unit 532 newly generates a record corresponding to each table (t1, t2).

During the processing, when a value is already stored in an item to be processed, the processing unit 532 does not carry out any processing. When any of the processing start conditions (communication states) is inapplicable, the processing unit 532 does not carry out any processing. At the time of updating the conference time, when the value corresponding to the start date and time or the end date and time of a given terminal 10 is not stored in the fresh history information, the processing unit 532 does not carry out any processing. At the time of updating the participation time, when the value corresponding to the participation date and time or the leaving date and time of a given terminal 10 is not stored in the fresh history information, the processing unit 532 does not carry out any processing.

Note that the above-mentioned processing rules are illustrated by way of example, and processing rules different from these processing rules may also be defined. Further, the processing may be executed using a program illustrating the rules, without using the processing rule management table (T).

The processing unit 532 is a function or means that is executed by the command from the CPU 201 shown in FIG. 6, and performs various processings, such as creation of processed history information indicating a history after processing, by performing a given processing on the fresh history information.

As various processings, for example, the processing unit 532 determines whether the fresh history information is stored in the temporary storage unit 529 through the transmission/reception unit 531, the LAN 590, and the transmission/reception unit 521. The processing unit 532 searches for the processing rule management table (T) by using the communication state information indicating the communication state included in the fresh history information received by the transmission/reception unit 531, as a search key, thereby extracting the corresponding processing information. The processing unit 532 processes the received fresh history information in accordance with the process content of the processing indicated by the extracted processing information, thereby creating processed history information indicating the history after the processing.

The processing unit 532 stores the processed history information generated by the processing unit 532, in a processed history storage unit 547 of the history management server 540, which is described later, through the transmission/reception unit 531 and the LAN 590. The processing unit 532 stores the fresh history information in a fresh history storage unit 548 of the history management server 540 through the transmission/reception unit 531 and the LAN 590, regardless of whether the processing unit 532 processes the fresh history information. However, when the processed history information cannot be stored in the processed history storage unit 547 and the fresh history storage unit 548, the processing unit 532 returns the fresh history information obtained before the processing to the temporary storage unit 529 of the temporary storage server 520 through the transmission/reception unit 531, the LAN 590, and the transmission/reception unit 521.

When a defect (e), due to the absence of information on a predetermined item in the fresh history information, occurs and the processing unit 532 fails to process the fresh history information, the processing unit 532 stores the fresh history information, in which the defect (e) occurs, in a defect fresh history storage unit 549 of the history management server 540 through the transmission/reception unit 531 and the LAN 590.

History Management Server

Next, the characteristic functions of the history management server 540 will be described. The history management server 540 includes a transmission/reception unit 541, a search unit 542, a defective history excluding unit 543, a processed history storage unit 547, a fresh history storage unit 548, and a defect fresh history storage unit 549.

The transmission/reception unit 541 is a function or means that is executed by the command from the CPU 201 shown in FIG. 6 and by the network I/F 209 shown in FIG. 6. This transmission/reception unit 541 transmits/receives various data (or information) with another server through the LAN 590.

The search unit 542 searches the processed history information, the acquisition of which is requested to the processed history storage unit 547, and extracts the corresponding processed history information.

The defective history excluding unit 543 is a function or means that is executed by the command from the CPU 201 shown in FIG. 6. The defective history excluding unit 543 examines whether there is a defect (E) due to the absence of information on the predetermined item in each processed history information, the acquisition of which is requested, and which is stored in the processed history storage unit 547, when the external input device 40 connected to the acquisition requesting terminal requests to acquire the processed history information, and excludes the processed history information in which the defect (E) occurs.

If the fresh history information is stored in the temporary storage unit 529 in descending order of transmission from each terminal 10, the defect (E) does not occur in the processed history information. However, in an asynchronous process by the temporary storage unit 529, the fresh history information is not always stored in descending order of transmission from each terminal 10. Further, as in this embodiment, in the case where there is a plurality of processing servers 530, even when the fresh history information is stored in the temporary storage unit 529 in descending order of transmission from each terminal 10, the processing is not always carried out in descending order of transmission from each terminal 10. Therefore, there is a possibility of providing the processed history information in which the defect (E) occurs, depending on the timing of the acquisition request from the acquisition requesting terminal. For this reason, the defective history excluding unit 543 of this embodiment examines whether the defect (E) is occurring in the processed history information, prior to the provision of the processed history information to the acquisition requesting terminal.

Next, the processed history storage unit 547 stores the processed history information generated by the processing unit 532 of each processing server 530. This processed history information is managed as a participant history management table (t1) as shown in FIG. 10A, and is managed as a conference history management table (t2) as shown in FIG. 10B.

Among them, the participant history management table (t1) is made up of attributes of history ID, terminal ID, conference ID, conference session ID, participation date and time, leaving date and time, participation time, and leaving state, as shown in FIG. 10A. Among these attributes, the attribute "history ID" indicates an ID for specifying a participant to a conference. The attribute "terminal ID" indicates an ID for specifying a terminal that participates in the conference, as an example of the terminal identification information. The attribute "conference ID" indicates an ID for specifying an attended conference.

The attribute "conference session ID" indicates an ID for specifying a conference session "seim" from the participation (join) state to the conference to the leaving (leave) state, as an example of the session sei. For example, when a certain terminal 10 repeatedly participates in and leaves the same conference after a while, the conference session ID shows different values.

Further, the attribute "participation date and time" indicates date and time when the terminal 10 attended the conference. The attribute "leaving date and time" indicates date and time when the terminal 10 left the conference. The attribute "participation time" indicates a time period from the time when the terminal 10 take parts in the conference to the time when the terminal 10 leaves the conference.

The attribute "leaving state" indicates a state where the terminal 10 leaves the conference. The state "leave" in the leaving state indicates that the terminal 10 has normally left the conference. A state "force-quit" indicates a state where the terminal 10 forcibly leaves the conference due to disconnection of the power supply or the like. The state "during conference" indicates that the terminal 10 is being participating in the conference.

Note that the attributes and the leaving state of the participant history management table (t1) are illustrated by way of example, and other data items and values may be included.

Subsequently, as shown in FIG. 10B, the conference history management table (t2) includes attributes of a conference ID, a host terminal ID, a start date and time, end date and time, and conference time. Among these attributes, the attribute "conference ID" indicates an ID for specifying a conference. The attribute "host terminal ID" indicates an ID for specifying a terminal serving as a conference host. For example, the conference host indicates a host of a conference when the conference is conducted by three persons. In this case, one of the three persons can participate in or leave the conference after the start of the conference. The participation or leaving of the one person is indicated by the participant history management table (t1).

The attribute "start date and time" indicates start date and time of the entire conference. The attribute "end date and time" indicates end date and time of the entire conference. The attribute "conference time" indicates an execution time of the entire conference.

Note that the attributes of the conference history management table (t2) are illustrated by way of example, and other data items and values may be included.

In this embodiment, two tables (t1, t2) are stored in one processed history storage unit, but the tables are not limited thereto. A DB may be constructed for each table.

Referring next to FIG. 7, the fresh history storage unit 548 stores the fresh history information stored in the temporary storage unit 529, directly as master data, for a long period of time. This can be used for fault analysis in the case where any fault occurs in the transmission system 1.

Since the defect (e) occurs due to the failure to display information of the predetermined item in the fresh history information, the defect fresh history storage unit 549 stores the fresh history information in which the defect (e) occurs, when the processing unit 532 cannot process the fresh history information.

Terminal Setting Utility Server

Next, the characteristic functions of the terminal setting utility server 550 will be described. The terminal setting utility server 550 is a server that receives an acquisition request for processed history information from the acquisition requesting terminal, and provides the processed history information to the terminal 10. This terminal setting utility server 550 includes a transmission/reception unit 551 and an auxiliary function unit 552.

Among them, the transmission/reception unit 551 is a function or means that is executed by a command from the CPU 201 shown in FIG. 6 and by the network I/F 209 shown in FIG. 6. This transmission/reception unit 551 serves as a window for receiving an acquisition request for the processed history information from the acquisition requesting terminal and for providing processed history information to the acquisition requesting terminal. The auxiliary function unit 552 is a function or means that is executed by the command from the CPU 201 shown in FIG. 6. This auxiliary function unit 552 executes various auxiliary functions other than the acquisition of the fresh history information, the communication control, and the like.

Charging History Generation Server

Next, the characteristic functions of the charging history generation server 560 will be described. The charging history generation server 560 is a server that generates a charging history for charging the user of the usage fee of the transmission system 1. This charging history generation server 560 includes a transmission/reception unit 561 and a charging history creation unit 562.

Among them, the transmission/reception unit 561 is a function or means that is executed by the command from the CPU 201 shown in FIG. 6, and by the network I/F 209 shown in FIG. 6. This transmission/reception unit 561 requests the history management server 540 through the LAN 590 to acquire participation time information (pi) indicating a participation time in which "participation date and time" and "leaving date and time" are present in a given period (for example, a period between Sep. 1 to Sep. 30, 2010), for each given terminal ID in the participation history management table (t1).

The transmission/reception unit 561 acquires the desired participation time information (pi) from the history management server 540. Further, the transmission/reception unit 561 transmits charging history information. (i), which is described later and generated by the charging history creation unit 562, to the file transfer server 570.

The charging history creation unit 562 is a function or means that is executed by the command from the CPU 201 shown in FIG. 6. This charging history creation unit 562 generates charging history information (i), which is a CSV (Comma Separated Values) file, based on the participation time information (pi) acquired by the transmission/reception unit 561.

File Transfer Server

Next, the characteristic functions of the file transfer server 570 will be described. The file transfer server 570 is connected to a file transfer server 610, which is described later, of the fee management system 60 through the dedicated line 2x. This allows the transmission management system 50 to transfer the electronic file to the fee management system 60 through the dedicated line 2x without involving the Internet 2i, thereby preventing falsification of fees or the like.

The file transfer server 570 includes a transmission/reception unit 571 and a communication control unit 572. Among them, the transmission/reception unit 571 is a function or means that is executed by the command from the CPU 201 shown in FIG. 6 and by the network I/F 209 shown in FIG. 6. This transmission/reception unit 571 receives the participation time information (pi) transmitted from the charging history generation server 560, and transfers the participation time information (pi) to the file transfer server 610, which is described later, of the fee management system 60, through the dedicated line 2x. The communication control unit 572 is a function or means that is executed by the command from the CPU 201 shown in FIG. 6, and controls transmission/reception of the information (data) to/from the transmission/reception unit 571.

Fee Management System

Figure 11:
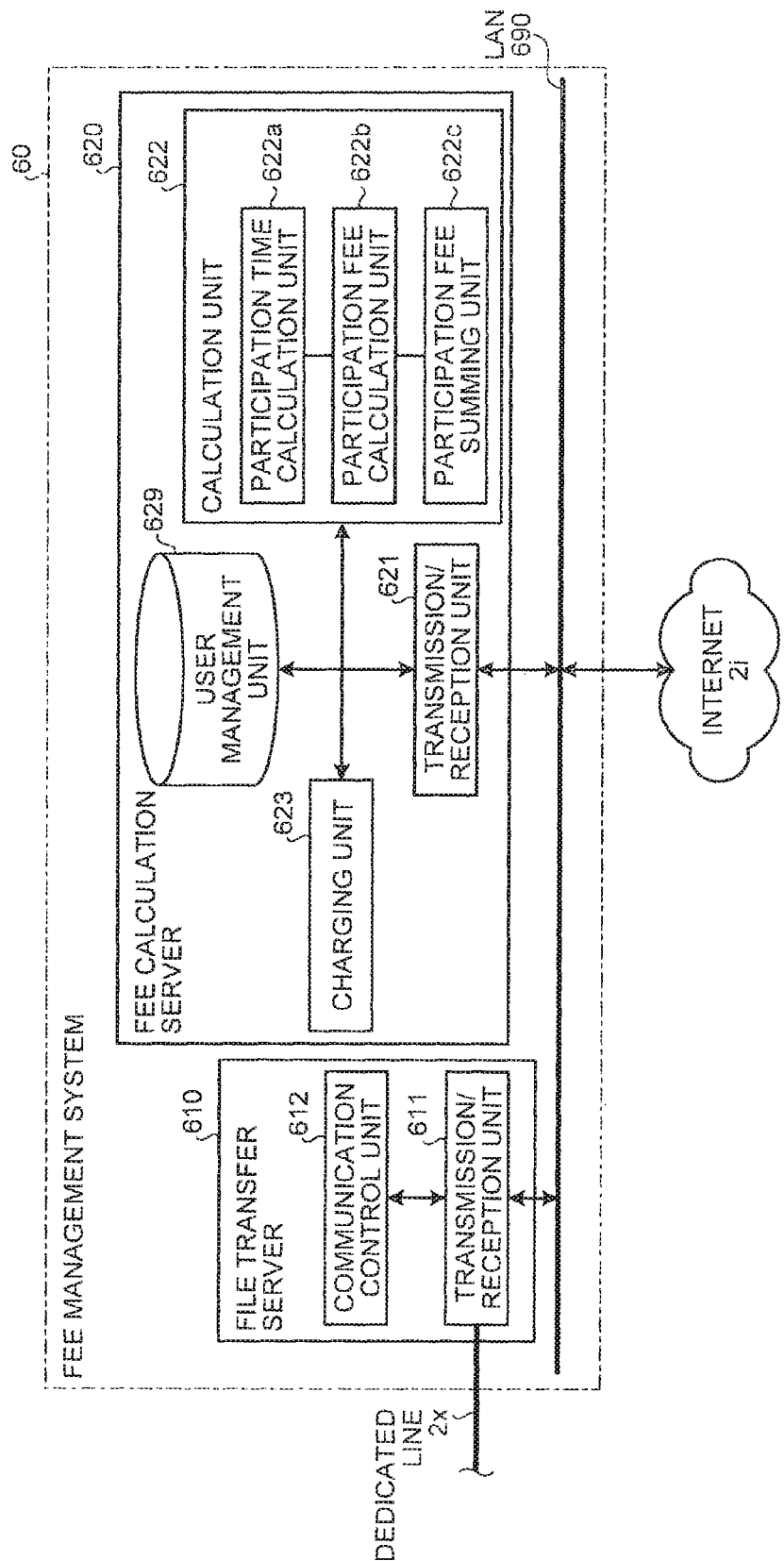
FIG. 11 is a functional block diagram illustrating a fee management system which is a characteristic part of this embodiment.

FIG. 11 is a functional block diagram of the fee management system 60 of this embodiment. As shown in FIG. 11, the fee management system 60 is constructed by the file transfer server 610 and a fee calculation server 620. These servers are connected together with a LAN 690 so as to communicate with each other, and are also connected with the Internet 2i through the LAN 690. The file transfer server 610 is also connected with the dedicated line 2x. Note that each server forming the fee management system 60 has a hardware configuration similar to that of the transmission management system 50, so the description thereof is omitted.

File Transfer Server

Next, the characteristic functions of the file transfer server 610 will be described. The file transfer server 610 is connected to the file transfer server 570 in the transmission management system 50 through a dedicated line 2x. This allows the fee management system 60 to receive an electronic file from the transmission management system 50 through the dedicated line 2x without involving the Internet 2i.

The file transfer server 610 includes a transmission/reception unit 611 and a communication control unit 612. Among them, the transmission/reception unit 611 is a function or means that is executed by the command from the CPU 201 shown in FIG. 6 and by the network I/F 209 shown in FIG. 6. This transmission/reception unit 611 receives the participation time information (pi) as the electronic file transmitted from the file transfer server 570 through the dedicated line 2x, and transfers the participation time information (pi) to the fee calculation server 620 through the LAN 690. The communication control unit 612 is a function or means that is executed by the command from the CPU 201 shown in FIG. 6, and controls transmission and reception of information (data) with respect to the transmission/reception unit 611.

Fee Calculation Server

Next, the characteristic functions of the fee calculation server 620 will be described. The fee calculation server 620 includes a transmission/reception unit 621, a calculation unit 622, a charging unit 623, and a user management unit 629.

Among them, the user management unit 629 is formed of the HD 204 and the HDD 205 which are shown in FIG. 6. This user management unit 629 is formed of a user management table (Ty). As shown in FIG. 12, this user management table (Ty) includes attributes (fields) of user contract number, user ID, user name, user address, user telephone number, user email address, and terminal ID. Note that the user contract number, user ID, user name, user address, user telephone number, and user email address are used singly or in combination as user identification information for identifying the user.

Among them, the attribute "contract number" indicates an identification number used when a contract for use of the transmission system 1 is concluded between the administrator and each user of the transmission system 1.

The attribute "user ID" includes an identifier for use in identifying the user, and the like.

The attribute "user name" indicates information representing the title or name of the user. The attribute "user address" indicates information representing the address or residence of the user, for example, the installation place of the terminal 20.

The attribute "user telephone number" indicates information representing the telephone number of the user. The attribute "user e-mail address" indicates information representing the e-mail address of the terminal 20.

The attribute "terminal ID" is an example of the terminal identification information, and indicates information representing terminal IDs of all terminals 10 owned by the user. For example, the user having the user ID "a123" owns the terminals 10 represented by the terminal IDs "11001", "11002", "11003", and the like.

The transmission/reception unit 621 is a function or means that is executed by the command from the CPU 201 shown in FIG. 6, and by the network I/F 209 shown in FIG. 6. This transmission/reception unit 621 transmits and receives various data (or information) to and from other terminals, systems, and the like through the Internet 2i and the LAN 690.

The calculation unit 622 is a function or means that is executed by the command from the CPU 201 shown in FIG. 6, and by the network I/F 209 shown in FIG. 6, and calculates a total participation fee for each user. The calculation unit 622 includes a participation time calculation unit 622a, a participation fee calculation unit 622b, and a participation fee summing unit 622c so as to calculate the total participation fee for each user.

Among them, the participation time calculation unit 622a refers to the participation history management table (t1) (see FIG. 10A) which is stored in the processed history storage unit 547 of the transmission management system 50, and sums up the participation times indicated by the participation time information corresponding to the terminal IDs within a predetermined period, thereby calculating the total participation time for each terminal 10 within the predetermined period. For example, referring to FIG. 10A, in the predetermined period (for example, one month of September, 2010) shown in FIG. 10A, a terminal ID "110001" is managed using history IDs "001", "005", and the like. Participation times "1 hour, 30 minutes, and 25 seconds", "1 hour, 10 minutes, and 10 seconds", and the like are summed up to thereby calculate the total participation time of the terminal 10 indicated by the terminal ID "110001".

The participation fee calculation unit 622b calculates the participation fee for each terminal 10 within the predetermined period based on the total participation time calculated by the participation time calculation unit 622a. For example, when the administrator preliminarily sets a participation time of one minute and a participation fee of 10 yen, assuming that the total participation time of a given terminal 10, which is calculated by the participation time calculation unit 622a, is 10 hours (600 minutes), the participation fee is 6000 yen.

The participation fee summing unit 622c refers to the user management table (Ty) (see FIG. 12) managed by the user management unit 629, and sums up the participation fees (calculated by the participation fee calculation unit 622b) of the terminal 10 indicated by the terminal ID corresponding to the user ID of the user to which the participation fee is charged, thereby calculating the total participation fee for each user. For example, referring to FIG. 12, since the terminal IDs corresponding to the user ID "a123" are "11001", "11002", "11003", and the like, the participation fees of each terminal 10 indicated by the terminal IDs "11001", "11002", "11003", and the like calculated by the participation fee calculation unit 622b are summed up to thereby calculate the total participation fee for the user indicated by the user ID "a123".

Next, the charging unit 623 is a function or means that is executed by the command from the CPU 201 shown in FIG. 6, and by the network I/F 209 shown in FIG. 6. The charging unit 623 refers to the user management table (Ty) shown in FIG. 12, and transmits, by e-mail, the participation fee charging information to the user e-mail address, which is the notification destination of the participation fee, from the transmission/reception unit 621 through the communication network 2. This participation fee charging information includes information on the total participation fee within the predetermined period of all the terminals 10 owned by each user, participation date, a person who demands such as an administrator, method of payment, and bank account for the participation fee.

Process or Operation of Embodiment

Figure 13:
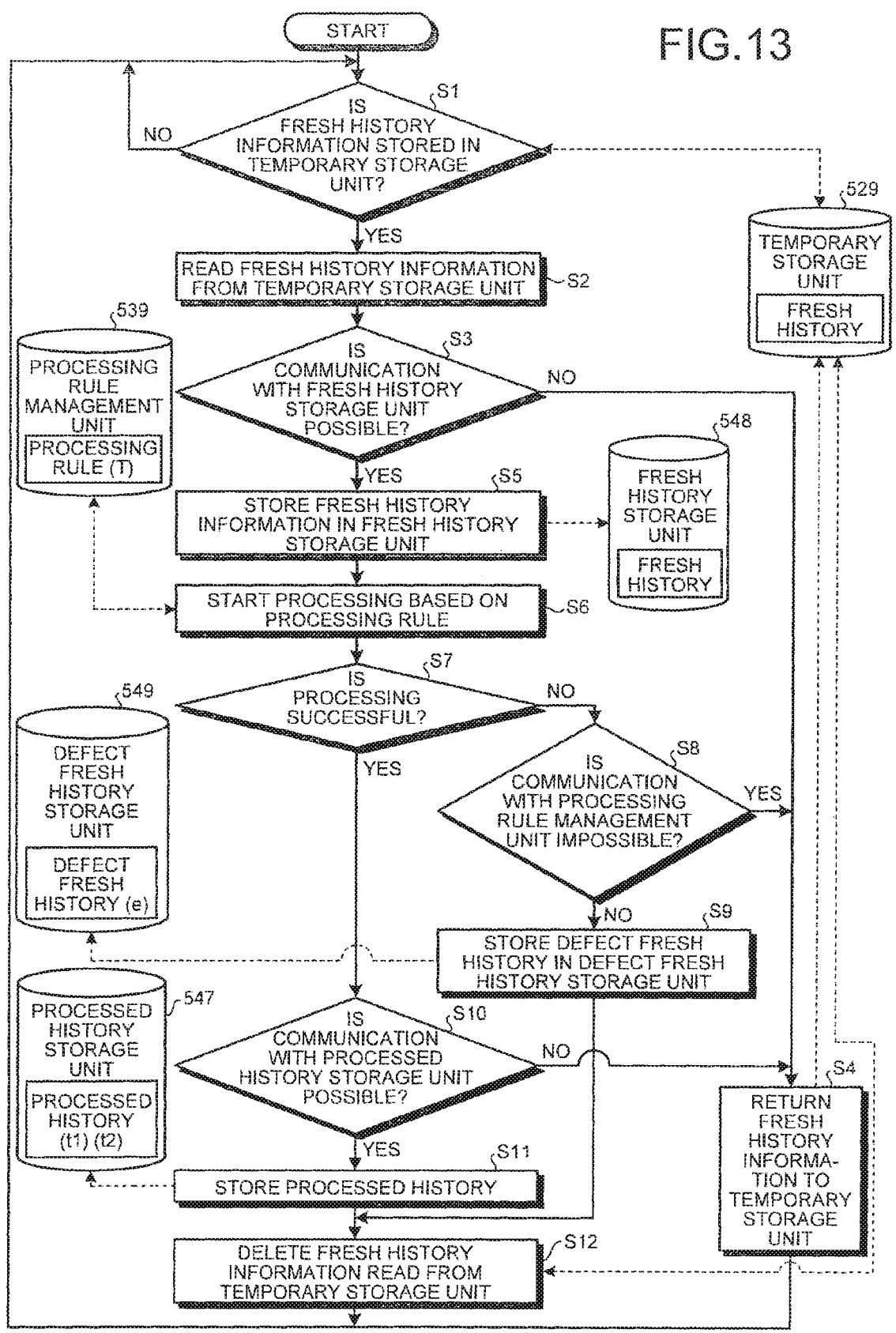
FIG. 13 is a flow chart illustrating a process in which the transmission management system generates processed history information by processing fresh history information.

Referring next to FIGS. 1, 7, and 13, a process method for the transmission system 1 according to this embodiment will be described. FIG. 13 is a flow chart illustrating a process in which the transmission management system processes the fresh history information to generate the processed history information.

Referring to FIG. 1, when the communication state changes, each terminal 10 transmits the fresh history information indicating the history about this communication state to the transmission management system 50. Referring to FIG. 7, the communication management server 510 of the transmission management system 50 receives the fresh history information transmitted from each terminal 10 and transmits the information to the temporary storage server 520. The transmission/reception unit 521 of the temporary storage server 520 receives the fresh history information transmitted from the communication management server 510. The temporary storage unit 529 then stores the fresh history information received by the transmission/reception unit 521. Thus, the temporary storage unit 529 sequentially stores the fresh history information. In this state, the process in which the transmission management system 50 processes the fresh history information to generate processed history information will be described with reference to FIG. 13. Note that the temporary storage server 520 may directly receive the fresh history information from each terminal 10.

FIG. 13 is a flow chart illustrating a process in which the transmission management system processes the fresh history information to generate processed history information.

First, the processing unit 532 of the processing server 530 determines whether the fresh history information is stored in the temporary storage unit 529 through the LAN 590 (step S1). When determining that the fresh history information is not stored (NO), the processing unit 532 constantly repeats the process of step S1.

Next, the processing unit 532 reads the fresh history information from the temporary storage unit 529 through the LAN 590 (step S2).

Next, the processing unit 532 determines whether the communication to the fresh history storage unit 548 is possible or not (step S3). In this step S3, when it is determined that there is no communication available (NO), the processing unit 532 returns the fresh history information to the temporary storage unit 529 through the LAN 590 (step S4). On the other hand, in the step S3 described above, when it is determined that the communication is possible (YES), the processing unit 532 causes the fresh history storage unit 548 of the history management server 540 to store the fresh history information as master data through the LAN 590 (step S5).

Next, the processing unit 532 searches for the processing rule management table (T) by using the fresh history information, which is read in the step S2 described above, as a search key, to extract the corresponding processing information. Further, the processing unit 532 carries out a given processing on the fresh history information in accordance with the processing content indicated by the extracted processing information, thereby creating the processed history information indicating the history after the processing (step S6). Note that in this step S6, the fresh history information indicating the communication state of "online" or "accept" shown in FIG. 9 is not handled as the processing start condition in the processing rule management table (T) shown in FIG. 8. Accordingly, the processing is not executed. Further, the fresh history information may include the defect (e) and the processing unit 532 may fail to process the fresh history information.

Next, the processing unit 532 determines whether the processing can be carried out in accordance with the process content in the step SC described above (step S7). When determining that the processing cannot be carried out (NO) in step S7, the processing unit 532 further determines whether the processing cannot be carried out because communication cannot be established with the processing rule management unit 539 (step S8).

In this step S8, when the processing unit 532 determines that the communication is impossible (YES), the processing unit 532 returns the fresh history information to the temporary storage unit 529 through the LAN 590 (similar to step S4). On the other hand, in step S8 described above, when the processing unit 532 determines that the communication is not impossible (NO), the processing unit 532 causes the defect fresh history storage unit 549 of the history management server 540 to store the fresh history information, in which the defect (e) occurs, through the LAN 590 (step S9). This allows the administrator of the transmission system 1 to analyze the fresh history information in which the defect (e) occurs, and to review countermeasures against the problem.

The processing unit 532 temporarily returns the fresh history information to the temporary storage unit 529. This seems to be because a temporary DB fault, unlike a fault of the communication network such as a LAN, occurs, even when the processing server 530 cannot communicate with the processing recording management unit (DB), and the information can be stored again in the DB after the DB is restored. As a result, the fresh history information is used as a processing target again, which avoids the state where the fresh history information including no defect (e) cannot be processed.

Further, the processing unit 532 causes the defect fresh history storage unit 549 to store the fresh history information in the case where every access to the processing rule management unit 539 is determined as an error, for example, when there is no information on the item necessary for the fresh history information. In such a case, it is meaningless to return the fresh history information to the temporary storage unit 529. Accordingly, the fresh history information is stored in the defect fresh history storage unit 549 as fresh history information including the defect (e) (error log).

Information indicating that the defect (e) has occurred may be notified to the administrator of the transmission system 1 by e-mail, instead of returning the fresh history information to the temporary storage unit 529 or storing the fresh history information to the defect fresh history storage unit 549, or by combining thereof. This allows the administrator to immediately recognize the state where the defect (e) is occurring.

Next, returning to step S7, when determining that the processing is successful (YES), the processing unit 532 further determines whether to be able to communicate with the processed history storage unit 547 (step S10). Then, in this step S10, when it is determined that there is no communication available (NO), the processing unit 532 returns the fresh history information to the temporary storage unit 529 through the LAN 590 (similar to step S4). On the other hand, in step S10 described above, it is determined that the communication is possible (YES), the processing unit 532 causes the processed history storage unit 547 of the history management server 540 to store the processed history information, which is processed in step S6 described above, through the LAN 590 (step S11).

Next, after the processes of steps S9 and S11, the processing unit 532 completely deletes the fresh history information read in step S2 described above from the temporary storage unit 529 of the temporary storage server 520 through the LAN 590 (step S12).

Next, after the processes of steps S12 and S4, the processing unit 532 returns to step S1 described above, and the process proceeds to the steps subsequent to step S1 for the subsequent fresh history information sequentially stored in the temporary storage unit 529.

Referring next to FIGS. 7 and 14 to 16, a description is given of the process in which the transmission management system 50 provides the acquisition requesting terminal with the processed history information, the acquisition of which is requested to the acquisition requesting terminal, when the terminal 10 requests the transmission management system 50 to acquire the processed history information.

Figure 14:
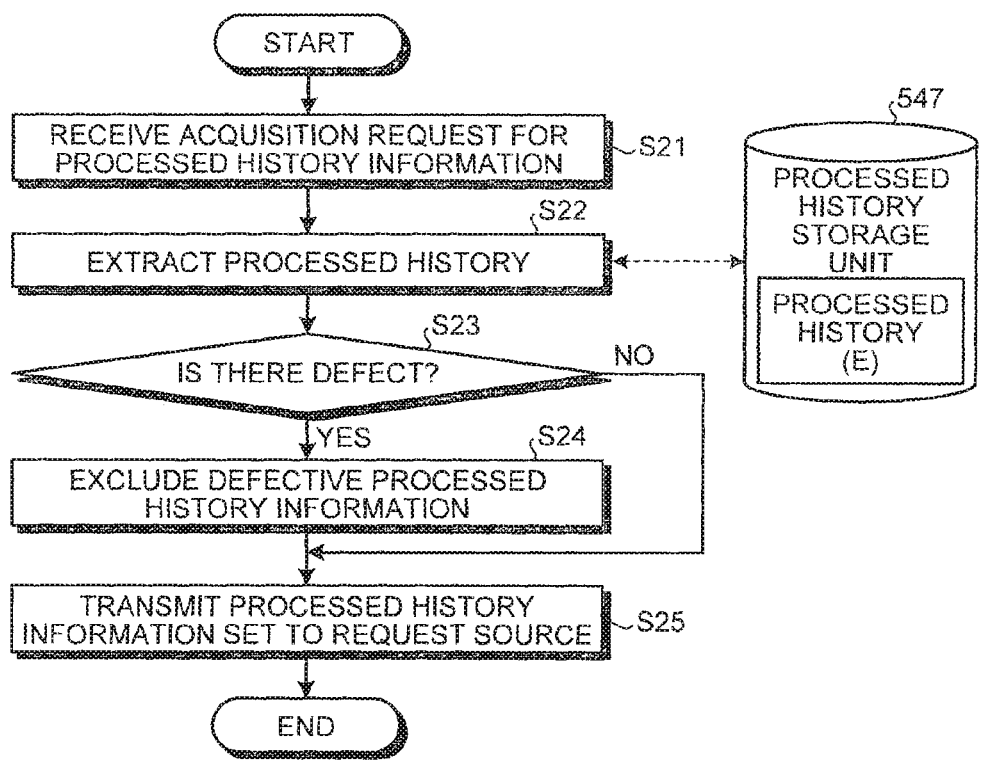
FIG. 14 is a flow chart illustrating a process in which an acquisition request for processed history information is received from a user and the processed history information is provided to the user.
Figure 15:
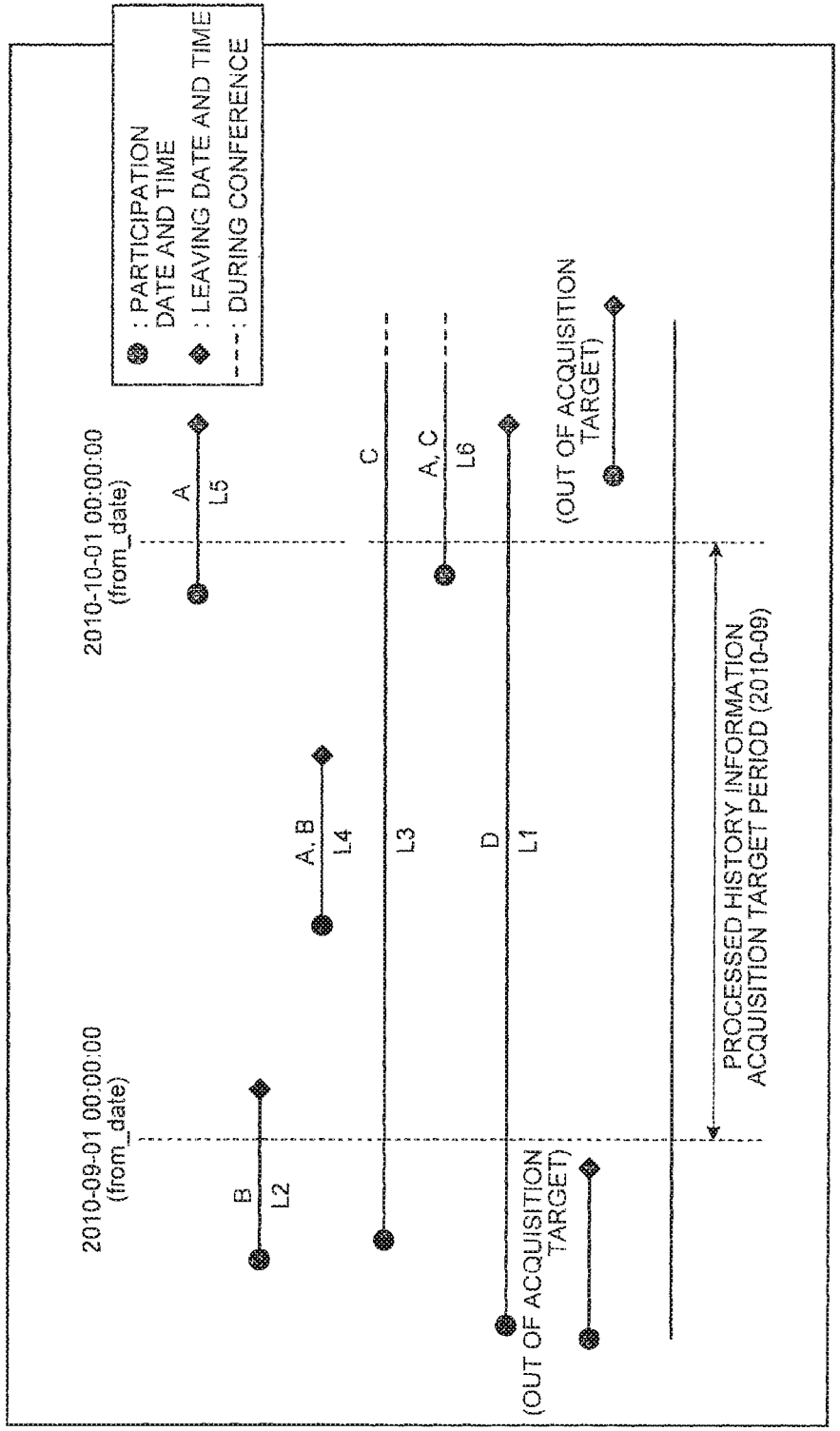
FIG. 15A is an explanatory diagram illustrating an acquisition target period of processed history information.
FIG. 15B is an explanatory diagram illustrating search conditions for searching fresh history information.

FIG. 14 is a flow chart illustrating a process in which an acquisition request for processed history information is received from a user of a terminal and the processed history information is provided to the user. FIG. 15A is an explanatory diagram illustrating an acquisition target period of processed history information. FIG. 15B is an explanatory diagram illustrating a search condition for searching fresh history information. FIG. 16 is a diagram illustrating an exemplary screen displayed on the display of the external input device.

First, as shown in FIG. 14, the transmission/reception unit 551 of the terminal setting utility server 550 shown in FIG. 7 receives an acquisition request indicating a request for acquiring the processed history information on the communication in the acquisition requesting terminal from the acquisition requesting terminal through the communication network 2, and transmits the acquisition request to the history management server 540 (step S21). This acquisition request includes, as search keys (search parameters) for use in searching processed history information, a terminal ID of an acquisition requesting terminal and an acquisition target period (for example, date, week, month, and year) of processed history information.

In response to this, the search unit 542 of the history management server 540 searches the processed history information, the acquisition of which is requested to the processed history storage unit 547, and extracts the corresponding processed history information (step S22). Specifically, the search unit 542 first calculates an acquisition target range (from_date, to_date) from the acquisition target period. For example, when the acquisition target period is 2010-09, the acquisition target range is from 0 o'clock AM on Sep. 1, 2010 to 12 o'clock PM on Sep. 30, 2010 (0 o'clock, October 1). Accordingly, the acquisition target range is represented as "from_date"=2010-09-01 00:00:00, "to_date"=2010A0-01 00:00:00. Next, the search unit 542 searches for the participant history management table (t1) to extract the corresponding processed history information (i1) in accordance with the search conditions (A, B, C, D) shown in FIG. 15B based on the terminal ID of the acquisition requesting terminal, "from_date", and "to_date". Next, the search unit 542 searches for the conference history management table (t2) by using the conference ID included in the extracted processed history information (i1) as a search key, and extracts the corresponding processed history information (i2). Then, the search unit 542 merges the extracted processed history information (i1) and the processed history information (i2), and generates processed history information (I) to be provided to the requesting terminal. When there is a plurality of processed history information (I), the search unit 542 merges the plurality of processed history information (I) to thereby generate a processed history information set (IG).

Now, the search method using the search conditions (A, B, C, D) described above will be described in detail. In this embodiment, the processing is performed in which the transmission management system 50 can provide the processed history information even when the leaving date and time is a plurality of months from the participation date and time. For example, when the terminal 10 participates in the conference on "2010-08-30" (Aug. 30, 2010) and there is fresh history information indicating that the terminal 10 leaves the conference on "2010A0-01" (Oct. 1, 2010), the transmission management system 50 carries out the process so as to provide the processed history information in any of August, September, and October. That is, among the terminal IDs, terminal IDs indicating that the period from the participation date and time and the leaving date and time overlaps the period of from_date to to_date are extraction targets. Referring to FIG. 15A, all fresh history information (L1 to L6) items are extraction targets. More specifically, the extraction targets are divided into four cases respectively corresponding to the search conditions (A, B, C, D) as shown in FIG. 15B. The division allows limitation of the search range using each search condition. Then, the search conditions are unified with "OR", thereby making it possible to extract desired fresh history information in a shorter search time. Note that the search conditions shown in FIG. 15B indicate the following cases.

(1) Search condition A: a case where the participation date and time is within the acquired target months The search range of the participation date and time can be limited only to the acquisition request target months.

(2) Search condition B: a case where the leaving date and time is within the acquired target months The search range of the leaving date and time can be limited only to the acquisition request target months.

(3) Search condition C: a case where a terminal participates in a conference before the acquisition request target month and is still attending the conference The search range of the leaving state can be limited only to the state "during conference". Further, unless the terminal participates in different conferences at the same time, there is only one fresh history information indicating the state "during conference" in a specific terminal 10.

(4) Search condition D: a case where the leaving date and time is a plurality of months from the participation date and time The fresh history information to be searched can be limited by the condition that "the participation time is equal to or greater than (to_date−from_date)" (one month or more in this example).

Though the description has been made of the case where the acquisition request target period is a monthly basis ("2010-09"), the fresh history information can be extracted by the same search method on a daily basis for example, "2010-09-01"), annually (for example, "2010"), or every arbitrary designated period (for example, "2010-09-01 00:00:00" to "2010-09-20 12:00:00"). The example shown in FIG. 15B illustrates the case where searching is carried out using the terminal ID of a certain acquisition requesting terminal, but searching can be carried out using terminal IDs of a plurality of acquisition requesting terminals. Further, parameters other than the terminal ID of the acquisition requesting terminal or the acquisition target period may also be used.

Next, a description will be given of the case where the transmission management system 50 provides the processed history information set (IG) to the acquisition requesting terminal.

Subsequently, the defective history excluding unit 543 determines whether the processed history information (I) in which the defect (E) occurs is included in the processed history information set (IG) to be provided (step S23). In this step S23, when determining that the defect (E) is occurring (YES), the defective history excluding unit 543 further excludes only the processed history information (I), in which the defect occurs, from the processed history information set (IG) (step S24). This allows the transmission management system 50 prevents provision of the processed history information, in which a defect occurs, to the acquisition requesting terminal.

Note that in this embodiment, the fresh history information is transmitted in the order of the communication states of "invite", "start", "join", "leave", and "end" from each terminal 10. Therefore, the defective history excluding unit 543 refers to the items of "host terminal ID", "start date and time", "participation date and time", "leaving date and time", and "end date and time" corresponding to those communication states, in the order reverse to the transmission order. When there is an item including no information on the communication state is present prior to an item including information on the communication state, it is determined that the defect (E) occurs in the processed history information. The rules indicating the determination as described above may be indicated in an electronic file or the like to be managed outside the defective history excluding unit 543.

Next, after step S24, or after determining that there s no defect in step S23 described above, the processed history information set (IG) is transmitted from the transmission/reception unit 541 of the history management server 540 to the terminal setting utility server 550, and the transmission/reception unit 551 transmits the processed history information set (IG) to the acquisition requesting terminal (step S25).

On the other hand, for step S25 described above, a "transmission terminal setting utility" screen 1000 as shown in FIG. 16 is displayed on the display 208 of the external input device 40 connected to the acquisition requesting terminal, owing to the browser function of the external input device 40. This screen 1000 displays a terminal ID 1001 of the terminal 10, a period 1002 of a history about communication indicated by the processed history information, an acquisition target period switching menu 1003 of the processed history information, the acquisition of which is requested, a processed history information set (IG) 1004, and the like.

Specifically, in a exemplary screen shown in FIG. 16, the external input device 40 logs in the terminal setting utility server 550 by using a host terminal ID "110001" of the acquisition requesting terminal. When the user requests to acquire the processed history information, the user selects "September, 2010" from the acquisition target period switching menu 1003. Thus, the external input device 40 requests to acquire the processed history information from the acquisition requesting terminal to the transmission management system 50 under the conditions of the host terminal ID "110001" and the acquisition target period "2010-09". As a result, the external input device 40 displays the screen 1000 shown in FIG. 16 on the display 208 of the external input device 40 based on the processed history information set (IG) transmitted from the transmission management system 50 through the requesting terminal.

Every time the selection of the acquisition target period switching menu 1003 is switched, or every time triangular switch buttons provided at both sides of the menu 1003 (the left-side button represents a previous month and the right-side button represents a next month) are pressed, a request for acquiring the processed history information corresponding to the changed acquisition target period is made.

Incidentally, when the history of the conference indicated by the processed history information corresponds to a plurality of months, the history is displayed as follows. Here, the following three cases are described assuming that the participation date and time is "2010-08-30 22:00:00" (22 o'clock, Aug. 30, 2010) and the leaving date and time is "2010A0-01 10:00:00" (10 o'clock, Oct. 1, 2010).
(1) A case where the communication history is directly displayed.
(1-1) The communication history for August is displayed as the participation date and time "2010-08-30 22:00:00" and the leaving date and time "2010A0-01 10:00:00".
(1-2) The communication history for September is displayed as the participation date and time "2010-08-30 22:00:00" and the leaving date and time "2010A0-01 10:00:00".
(1-3) The communication history for October is displayed as the participation date and time "2010-08-30 22:00:00" and the leaving date and time "2010A0-01 10:00:00".
(2) A case where a period over one month is trimmed (deleted) at the boundary of the month but all the participation date and time and the leaving date and time are displayed Note that the trimming process may be carried out by the auxiliary function unit 552 of the terminal setting utility server 550 or by the search unit 542 of the history management server 540.
(2-1) The communication history for August is displayed as the participation date and time "2010-08-30 22:00:00" and the leaving date and time "2010-08-31 23:59:59".
(2-2) The communication history for September is displayed as the participation date and time "2010-09-01 00:00:00" and the leaving date and time "2010-09-30 23:59:59".
(2-3) The communication history for October is displayed as the participation date and time "2010A0-01 00:00:00" and the leaving date and time "2010A0-01 10:00:00".
(3) A Case where a period over one month is trimmed at the boundary of the month and the participation date and time or the Leaving Date and Time is not Displayed (a Case where a Period Over One Month is Indicated by "<--", "-->", or the Like)

Note that this trimming process may be carried out by the auxiliary function unit 552 of the terminal setting utility server 550 or by the search unit 542 of the history management server 540.
(3-1) The communication history for August is displayed as the participation date and time "2010-08-30 22:00:00" and the leaving date and time "-->".
(3-2) The communication history for September is displayed as the participation date and time "<--" and the leaving date and time "-->".
(3-3) The communication history for October is displayed as the participation date and time "2010-08-30 22:00:00" and the leaving date and time "2010A0-01 10:00:00".

The transmission of a communication log is received by a message cue (messaging system for asynchronous communication), which eliminates the need to wait for the end of a log shaping process on the communication log transmission side. Accordingly, the intrinsic process, such as communication control, is prevented from being interrupted.

Figure 17:
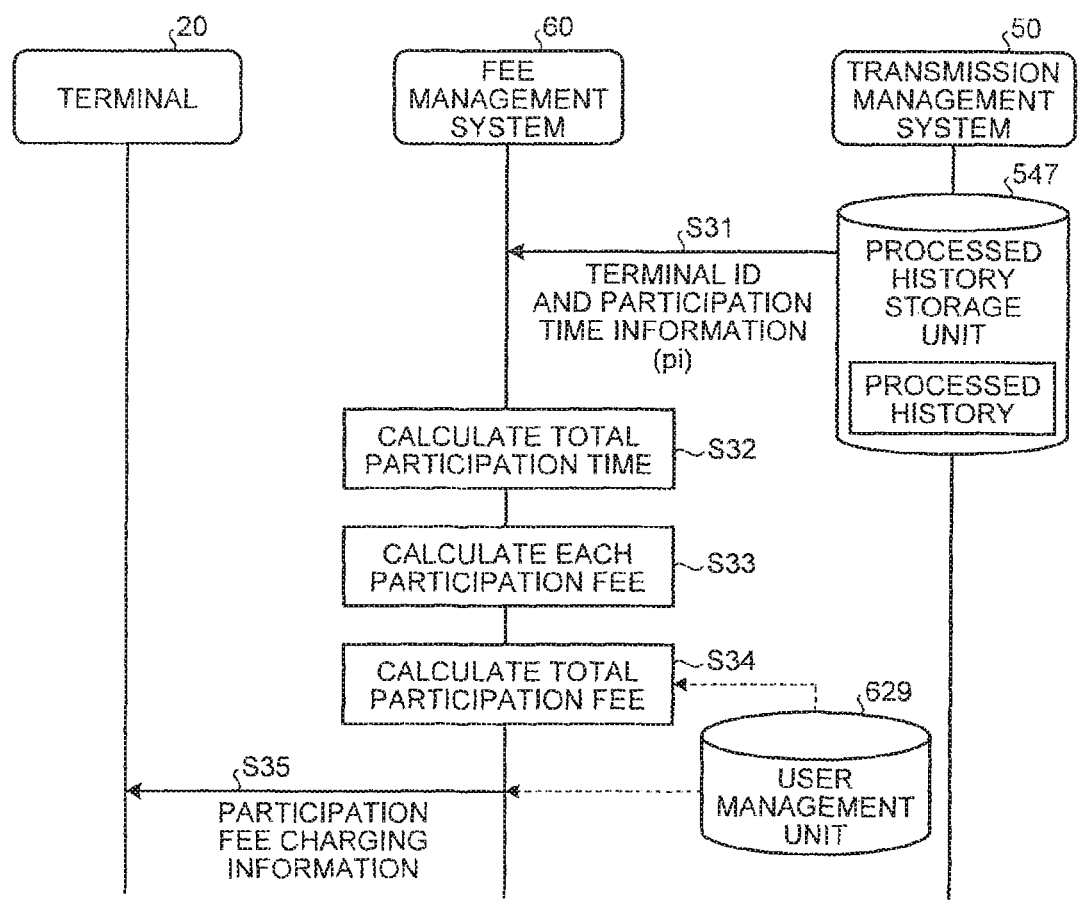
FIG. 17 is a sequence chart illustrating a charging method.

Referring next to FIGS. 11, 17, and 18, a description is given of the case where the administrator of the transmission system 1 charges the user of the transmission system 1 of the participation fee incurred when the user participates in a television conference by using the transmission system 1. FIG. 17 is a sequence chart illustrating a fee charging method. FIG. 18 is a conceptual diagram illustrating participation fees.

Note that this user is not a user unit for each terminal 10, but is a user as a unit of payment of the participation fee. In the example shown in FIG. 1, this user unit is set assuming that the participation fee is paid separately by four offices, i.e., Tokyo office, Osaka office, New York office, and Washington D.C. office.

First, the transmission management system 50 transmits the terminal ID and the participation time information (pi) to the fee management system 60 through the dedicated line 2x (step S31). Thus, the fee management system 60 receives the participation time information (pi) for each terminal 10. Specifically, in the fee calculation server 620 of the fee management system 60, the transmission/reception unit 621 receives the terminal ID and the participation time information (pi) from the processed history storage unit 547 of the history management server 540 of the transmission management system 50 through the transmission/reception unit 541, the LAN 590, transmission/reception unit 571, the dedicated line 2x, the transmission/reception unit 611, the LAN 690, and the transmission/reception unit 621 in this order. Note that the fee management system 60 may request the transmission management system 50 to transmit the participation time information (pi), or the transmission management system 50 may transmit the participation time information (pi) to the fee management system 60 periodically (for example, on the 1st day of each month).

Next, the participation time calculation unit 622a sums up the participation times indicated by the participation time information corresponding to the terminal ID based on the participation time information (pi) within the predetermined period (for example, one day) acquired from the history management server 540, thereby calculating the total participation time for each terminal 10 within the predetermined period (step S32). Note that the transmission/reception unit 621 may acquire the participation time information (pi) from the history management server 540 through the LAN 690, the Internet 2i, the LAN 590, and the transmission/reception unit 541 in this order.

Next, the participation fee calculation unit 622b of the calculation unit 622 calculates the participation fee for each terminal 10 within the predetermined period based on the total participation time calculated in step S31 described above (step S33). For example, when the administrator preliminarily sets a participation time of one minute and a participation fee of 10 yen, assuming that the total participation time of a given terminal 10, which is calculated in step S31 described above, is 10 hours (600 minutes), the participation fee is 6000 yen.

Next, the participation fee summing unit 622c of the calculation unit 622 refers to the user management table (Ty) (see FIG. 12) managed by the user management unit 629, and sums up the participation fees (calculated in step S33 described above) of the terminal 10 indicated by the terminal ID corresponding to the user ID of the user, to which the participation fee is charged, thereby calculating the total participation fee for each user (step S34). For example, referring to FIG. 12, since the terminal IDs corresponding to the user ID "a123" are "11001", "11002", "11003", and the like, the participation fees of the terminals indicated by the terminal IDs "11001", "11002", "11003", and the like calculated in step S32 described above, thereby calculating the total participation fee of the user indicated by the user ID "a123".

As described above, as shown in FIG. 18, the fee management system 60 can calculate the total participation fee for each user.

Next, the charging unit 623 of the fee management system 60 refers to the user management table (Ty) shown in FIG. 12, and transmits the participation fee charging information by e-mail to the user e-mail address which is the notification destination of the participation fee (step S35). This participation fee charging information includes the total participation fee for each user as shown in FIG. 18, which allows each user to recognize the total participation fee to be paid by each user.

Main Effects of Embodiment

According to this embodiment as described above, the total participation fee is calculated from the total participation time during which each user participates in the conversation. This allows the administrator of the transmission system 1 to charge each user of the fee corresponding to the time during which each user (each speaker) actually participates in the conversation. This provides the advantageous effect of providing fair fee charging for each user.

The transmission management system 50 generates and stores the processed history information prior to the reception of the acquisition request for the processed history information on the communication in each terminal 10 from each terminal 10. Accordingly, it is possible to rapidly provide the processed history information to the requesting terminal 10, upon reception of the acquisition request for the processed history information from each terminal 10.

Further, the conversation session seim may be continued for over one month (September in this case), for example, August, September, and October. In such a case, even when the user requests to acquire the processed history information for September, the transmission management system 50 cannot search the fresh history information indicating the communication states of "join" and "leave" only in the data of September, and cannot extract the corresponding fresh history information. Accordingly, the transmission management system 50 needs to search the fresh history information on the communication state "join" indicating that the communication is started before September, and to specify one fresh history information from a given conference ID (x). Subsequently, the transmission management system 50 needs to search the fresh history information indicating the communication state "leave" in which the communication is ended after September, and to specify one fresh history information based on the conference ID identical with the conference ID (x) described above. Accordingly, the transmission management system 50 requires a long period of time for searching the fresh history information, which cases a problem that it takes a long time to generate the processed history information. In this embodiment, however, the search time can be shortened by the search method as shown in FIGS. 15A and 2, thereby making it possible to rapidly generate the processed history information.

Other Embodiment

The processing unit 532 may add "defect flag" to the attributes of the participant history management table (t1) shown in FIG. 10A to generate the participant history management table (t11) shown in FIG. 19A. Similarly, the processing unit 532 may add "defect flag" to the attributes of the conference history management table (t2) shown in FIG. 10B to generate the conference history management table (t12) shown in FIG. 19B. In this case, the defective history excluding unit 543 shown in FIG. 7 determines whether the defect (E) occurs in the processed history information stored in the processed history storage unit 547, prior to the reception of the acquisition request for the processed history information from the terminal 10. When there is no defect, "0" is input as examination result information to the attribute of "defect flag" in each record shown in FIGS. 19A and 2. When there is a defect, "1" is input as the examination result information. Thus, the communication management server 510 can exclude the processed history information including "defect flag" indicating "1" and can receive the processed history information from the history management server 540. It is not necessary for the defective history excluding unit 543 to determine whether there is a defect in the processed history information, after receiving the acquisition request for the processed history information from the acquisition requesting terminal. This makes it possible to more rapidly provide the processed history information to the acquisition requesting terminal. Though "0" indicates normal and "1" indicates defective (abnormal) in this example, the type of information is not limited thereto. Any information, such as "true" and "false"

and "normal" and "defect", may be used, as long as the information can be used to determine whether there is a defect or not.

For example, in the transmission management system 50, a plurality of sets of the temporary storage unit 529, the processing unit 532, and the processed history storage unit 547, which are shown in FIG. 7, may be provided, and the fresh history information, processed history information, and the like may be sequentially transferred to various sets of the temporary storage units 529 by message relay or the like, thereby creating various types of processed history information from one fresh history information.

Though the communication management server 510, the temporary storage server 520, the plurality of processing servers 530, the history management server 540, and the terminal setting utility server 550 are described as separate servers, but the servers are not limited thereto. The transmission management system 50 having one or more of the functions of these servers may be used.

The relay apparatus 30, the external input device 40, the transmission management system 50, the fee management system 60, the program providing system 90, and the maintenance system 100 may be constructed by a single computer, or may be constructed by a plurality of computers that are divided and arbitrarily allocated to each parts (functions or means). When the program providing system 90 is constructed by a single computer, the program transmitted by the program providing system 90 may be transmitted to a plurality of modules in a distributed manner, or may be transmitted in a non-distributed manner. Further, when the program providing system 90 is constructed by a plurality of computers, the program may be transmitted from each computer in the state of being divided into a plurality of modules.

Recording media in which programs for the relay apparatus 30, the external input device 40, the transmission management system 50, the fee management system 60, the program providing system 90, and the maintenance system 100 are collectively or separately recorded, the HD 204 in which these programs are collectively or separately stored, and the program providing system 90 including the HD 204 are used as program products with which each program is provided to a user or the like within or outside the country.

In the embodiment described above, the case of the television conference system has been described above as an example of the transmission system 1. However, the transmission system 1 is not limited to this, but may be a telephone system such as an IP (Internet Protocol) telephone or Internet telephone. Also a car navigation system may be used as the transmission system 1. In this case, for example, one of the terminals 10 corresponds to a car navigation device mounted on a vehicle, and the other of the terminals 10 corresponds to a management terminal or a management server of a management center that manages car navigation, or a car navigation device mounted on another vehicle. The history about a call made for a certain period may be a communication history or a call history of a cellular phone.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A transmission system, comprising:
a transmission management system configured to manage information on a conference in which a plurality of transmission terminals participate; and
a fee management system configured to manage participation fee information indicating a participation fee incurred when each transmission terminal participates in the conference, wherein the transmission management system includes:
a plurality of processing servers configured to receive, from each transmission terminal, raw history information on the participation in the conference, wherein each processing server processes the raw history information so as to generate pieces of processed history information;
a history management server configured to exclude, from the pieces of the processed history information respectively generated by the processing servers, any pieces of the processed history information in which a defect occurs; and
a transmission circuit configured to transmit the processed history information other than the excluded pieces of the processed history information to the fee management system through a communication network, and
the fee management system includes circuitry configured to
receive the processed history information transmitted from the transmission management system,
calculate a total participation time in which each transmission terminal participates in the conference based on the received processed history information,
calculate a participation fee for each transmission terminal based on the calculated total participation time, and
sum up participation fees of each transmission terminal to calculate a total participation fee.

2. The transmission system according to claim 1, wherein the circuitry is further configured to:
store an e-mail address of a user indicated by user identification information, for each user identification information, and
transmit an e-mail for charging the total participation fee to the e-mail address corresponding to the user identification information on the user charged the total participation fee.

3. The transmission system according to claim 1, wherein the communication network includes a dedicated line.

4. A maintenance system that performs maintenance for the transmission management system or the fee management system according to claim 1.

5. A method for managing participation fee information in a transmission system, comprising:
managing, by a transmission management system, information on a conference in which a plurality of transmission terminals participate;
managing, by a fee management system, participation fee information indicating a participation fee incurred when each transmission terminal participates in the conference;
receiving, by a plurality of processing servers, from each transmission terminal, raw history information on the participation in the conference, wherein each processing server processes the raw history information so as to generate pieces of processed history information;

excluding, from the pieces of the processed history information respectively generated by the processing servers, any pieces of the processed history information in which a defect occurs;

transmitting the processed history information other than the excluded pieces of the processed history information to the fee management system through a communication network;

receiving the processed history information transmitted from the transmission management system;

calculating a total participation time in which each transmission terminal participates in the conference based on the received processed history information;

calculating a participation fee for each transmission terminal based on the calculated total participation time; and summing up participation fees of each transmission terminal to calculate a total participation fee.

6. The method according to claim 5, further comprising:

storing an e-mail address of a user indicated by user identification information, for each user identification information; and transmitting an e-mail for charging the total participation fee to the e-mail address corresponding to the user identification information of the user charged the total participation fee.

7. A non-transitory computer-readable medium storing program code that, when executed, causes a computer to execute the method according to claim 5.

* * * * *